US012439592B2

(12) United States Patent
Parekh et al.

(10) Patent No.: US 12,439,592 B2
(45) Date of Patent: Oct. 7, 2025

(54) METHODS OF FORMING MICROELECTRONIC DEVICES, AND RELATED MICROELECTRONIC DEVICES, MEMORY DEVICES, AND ELECTRONIC SYSTEMS

(71) Applicant: Micron Technology, Inc., Boise, ID (US)

(72) Inventors: Kunal R. Parekh, Boise, ID (US); Angela S. Parekh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 816 days.

(21) Appl. No.: 17/500,773

(22) Filed: Oct. 13, 2021

(65) Prior Publication Data

US 2023/0110367 A1     Apr. 13, 2023

(51) Int. Cl.
| | |
|---|---|
| *H10B 43/20* | (2023.01) |
| *G11C 5/06* | (2006.01) |
| *H01L 21/768* | (2006.01) |
| *H10B 41/27* | (2023.01) |

(Continued)

(52) U.S. Cl.
CPC ............... *H10B 41/27* (2023.02); *G11C 5/06* (2013.01); *H01L 21/76802* (2013.01); *H10B 43/27* (2023.02); *H10D 30/63* (2025.01)

(58) Field of Classification Search
CPC ........ H10B 43/27; H10B 41/27; H10B 41/20; H10B 43/20
See application file for complete search history.

(56) References Cited

U.S. PATENT DOCUMENTS

| | | |
|---|---|---|
| 7,372,091 B2 | 5/2008 | Leslie |
| 7,897,485 B2 | 3/2011 | Parekh |
| 8,958,228 B2 | 2/2015 | Samachisa et al. |

(Continued)

FOREIGN PATENT DOCUMENTS

WO     2008063251 A2     5/2008

OTHER PUBLICATIONS

Taiwanese Search Report and Office Action from Taiwanese Application No. 111137484, dated Oct. 24, 2023, 5 pages.

(Continued)

*Primary Examiner* — Christopher A Johnson
(74) *Attorney, Agent, or Firm* — TraskBritt

(57) ABSTRACT

A method of forming a microelectronic device comprises forming a first microelectronic device structure comprising a preliminary stack structure comprising sacrificial structures and insulative structures vertically alternating with the sacrificial structures. A second microelectronic device structure comprising control logic circuitry is formed. The first microelectronic device structure is attached to the second microelectronic device structure to form an assembly. After forming the assembly, the sacrificial structures are at least partially replaced with conductive structures to form a stack structure. Contact structures are formed to extend through the stack structure. One or more of the contact structures are coupled to the control logic circuitry. Conductive line structures are formed over the stack structure. One or more of the conductive line structures are coupled to the one or more of the contact structures. Microelectronic devices, memory devices, and electronic systems are also described.

15 Claims, 11 Drawing Sheets

(51) Int. Cl.
    *H10B 43/27*           (2023.01)
    *H10D 30/63*           (2025.01)

(56) References Cited

U.S. PATENT DOCUMENTS

| | | | |
|---|---|---|---|
| 9,530,790 B1 | 12/2016 | Lu et al. | |
| 9,653,617 B2 | 5/2017 | Zhou et al. | |
| 9,922,716 B2 | 3/2018 | Hsiung et al. | |
| 10,354,980 B1* | 7/2019 | Mushiga | H01L 21/76898 |
| 10,381,362 B1 | 8/2019 | Cui et al. | |
| 10,756,105 B2 | 8/2020 | Fukuzumi et al. | |
| 11,335,602 B2 | 5/2022 | Parekh | |
| 11,380,669 B2 | 7/2022 | Parekh | |
| 11,545,456 B2 | 1/2023 | Goda et al. | |
| 11,557,569 B2 | 1/2023 | Parekh | |
| 11,563,018 B2 | 1/2023 | Parekh | |
| 2003/0113669 A1 | 6/2003 | Cheng et al. | |
| 2006/0076690 A1 | 4/2006 | Khandros et al. | |
| 2009/0168482 A1 | 7/2009 | Park et al. | |
| 2010/0320526 A1* | 12/2010 | Kidoh | H10B 43/27 257/E21.409 |
| 2012/0146118 A1* | 6/2012 | Lee | H10B 41/49 257/296 |
| 2016/0104715 A1 | 4/2016 | Pachamuthu et al. | |
| 2016/0343727 A1 | 11/2016 | Kim et al. | |
| 2017/0054036 A1 | 2/2017 | Dorhout et al. | |
| 2018/0261671 A1 | 9/2018 | Matsumoto et al. | |
| 2019/0057974 A1* | 2/2019 | Lu | H10B 43/35 |
| 2019/0312051 A1 | 10/2019 | Park et al. | |
| 2020/0013792 A1 | 1/2020 | Parekh et al. | |
| 2020/0013798 A1 | 1/2020 | Parekh | |
| 2020/0027892 A1 | 1/2020 | Zhu et al. | |
| 2020/0295025 A1 | 9/2020 | Lu et al. | |
| 2021/0159242 A1 | 5/2021 | Jang et al. | |
| 2021/0217730 A1 | 7/2021 | Parekh et al. | |
| 2021/0272845 A1 | 9/2021 | Chandolu et al. | |
| 2021/0398847 A1 | 12/2021 | Parekh | |
| 2021/0398897 A1 | 12/2021 | Parekh | |
| 2022/0020736 A1 | 1/2022 | Yip et al. | |
| 2022/0059560 A1 | 2/2022 | Parekh | |
| 2022/0246681 A1 | 8/2022 | Parekh | |

OTHER PUBLICATIONS

Choe, "YMTC is China's First Mass Producer of 3D NAND Flash Memory Chips", Mar. 2012, Revised Apr. 7, 2020, 2 pages.
Li et al., "Skybridge-3D-CMOS: A Fine-Grained 3D Cmos Integrated Circuit Technology", IEEE Transactions on Nanotechnology, vol. 16, No. 4, Jul. 2017, 14 pages.
YMTC, "About Xtacking", Apr. 20, 2020, www.ymtc.com/index.php?s=/cms/cate/69.html.
International Search Report for International Application No. PCT/US2022/076662, mailed Jan. 9, 2023, 4 pages.
International Written Opinion for International Application No. PCT/US2022/076662, mailed Jan. 9, 2023, 5 pages.
Taiwanese Search Report and Office Action from Taiwanese Application No. 113133823, dated Oct. 15, 2024, 11 pages with English translation.
European Extended Search Report and Opinion for European Application No. 2281902.5, dated Apr. 23, 2025, 13 pages.
European Partial Supplementary Search Report for European Application No. 22881902.5, dated Jan. 29, 2025, 15 pages.

* cited by examiner

METHODS OF FORMING MICROELECTRONIC DEVICES, AND RELATED MICROELECTRONIC DEVICES, MEMORY DEVICES, AND ELECTRONIC SYSTEMS

TECHNICAL FIELD

The disclosure, in various embodiments, relates generally to the field of microelectronic device design and fabrication. More specifically, the disclosure relates to methods of forming microelectronic devices, and to related microelectronic devices, memory devices, and electronic systems.

BACKGROUND

Microelectronic device designers often desire to increase the level of integration or density of features within a microelectronic device by reducing the dimensions of the individual features and by reducing the separation distance between neighboring features. In addition, microelectronic device designers often desire to design architectures that are not only compact, but offer performance advantages, as well as simplified, easier and less expensive to fabricate designs.

One example of a microelectronic device is a memory device. Memory devices are generally provided as internal integrated circuits in computers or other electronic devices. There are many types of memory devices including, but not limited to, non-volatile memory devices (e.g., NAND Flash memory devices). One way of increasing memory density in non-volatile memory devices is to utilize vertical memory array (also referred to as a "three-dimensional (3D) memory array") architectures. A conventional vertical memory array includes vertical memory strings extending through openings in one or more decks (e.g., stack structures) including tiers of conductive structures and dielectric materials. Each vertical memory string may include at least one select device coupled in series to a serial combination of vertically stacked memory cells. Such a configuration permits a greater number of switching devices (e.g., transistors) to be located in a unit of die area (i.e., length and width of active surface consumed) by building the array upwards (e.g., vertically) on a die, as compared to structures with conventional planar (e.g., two-dimensional) arrangements of transistors.

Control logic devices within a base control logic structure underlying a memory array of a memory device (e.g., a non-volatile memory device) have been used to control operations (e.g., access operations, read operations, write operations) on the memory cells of the memory device. An assembly of the control logic devices may be provided in electrical communication with the memory cells of the memory array by way of routing and interconnect structures. However, processing conditions (e.g., temperatures, pressures, materials) for the formation of the memory array over the base control logic structure can limit the configurations and performance of the control logic devices within the base control logic structure. In addition, the quantities, dimensions, and arrangements of the different control logic devices employed within the base control logic structure can also undesirably impede reductions to the size (e.g., horizontal footprint) of a memory device, and/or improvements in the performance (e.g., faster memory cell ON/OFF speed, lower threshold switching voltage).

DETAILED DESCRIPTION

Figure 1A:
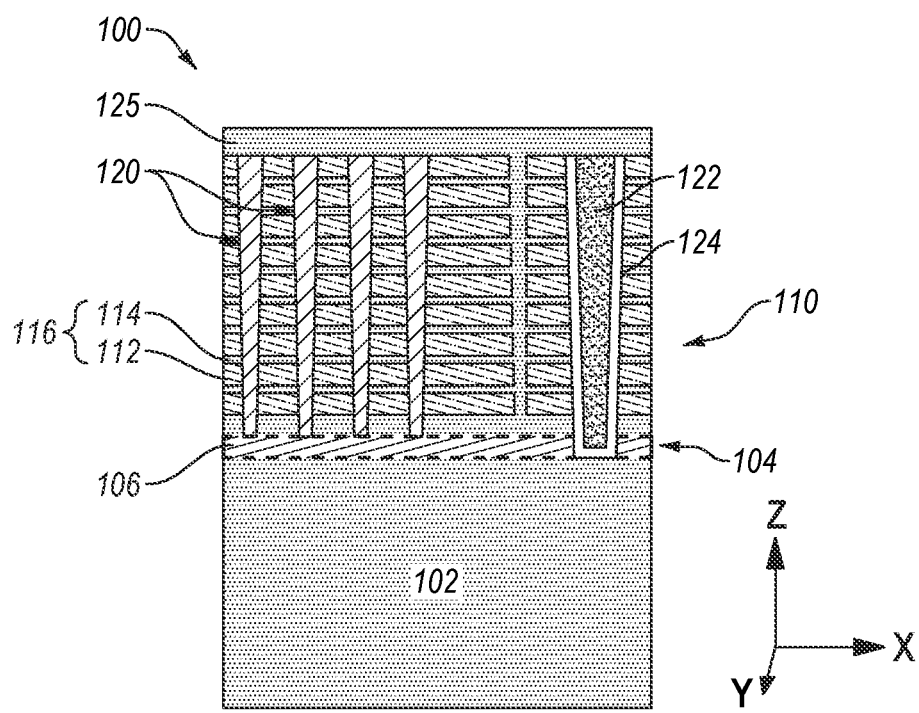
FIGS. 1A through 1F are simplified, partial cross-sectional views illustrating different processing stages of a method of forming a microelectronic device, in accordance with embodiments of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional microelectronic device fabrication techniques employed in the industry. In addition, the description provided below does not form a complete process flow for manufacturing a microelectronic device (e.g., a memory device). The structures described below do not form a complete microelectronic device. Only those process acts and structures necessary to understand the embodiments of the disclosure are described in detail below. Additional acts to form a complete microelectronic device from the structures may be performed by conventional fabrication techniques.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, a "memory device" means and includes microelectronic devices exhibiting memory functionality, but not necessarily limited to memory functionality. Stated another way, and by way of non-limiting example only, the term "memory device" includes not only conventional memory (e.g., conventional non-volatile memory; conventional volatile memory), but also includes an application specific integrated circuit (ASIC) (e.g., a system on a chip (SoC)), a microelectronic device combining logic and memory, and a graphics processing unit (GPU) incorporating memory.

As used herein, the terms "configured" and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the terms "vertical," "longitudinal," "horizontal," and "lateral" are in reference to a major plane of a structure and are not necessarily defined by earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure. With reference to the drawings, a "horizontal" or "lateral" direction may be perpendicular to an indicated "Z" axis, and may be parallel to an indicated "X" axis and/or parallel to an indicated "Y" axis; and a "vertical" or "longitudinal" direction may be parallel to an indicated "Z" axis, may be perpendicular to an indicated "X" axis, and may be perpendicular to an indicated "Y" axis.

As used herein, features (e.g., structures, materials, regions, devices) described as "neighboring" one another means and includes features of the disclosed identity (or identities) that are located most proximate (e.g., closest to) one another. Additional features (e.g., additional regions, additional structures, additional devices) not matching the disclosed identity (or identities) of the "neighboring" features may be disposed between the "neighboring" features. Put another way, the "neighboring" features may be positioned directly adjacent one another, such that no other feature intervenes between the "neighboring" features; or the "neighboring" features may be positioned indirectly adjacent one another, such that at least one feature having an identity other than that associated with at least one the "neighboring" features is positioned between the "neighboring" features. Accordingly, features described as "vertically neighboring" one another means and includes features of the disclosed identity (or identities) that are located most vertically proximate (e.g., vertically closest to) one another. Moreover, features described as "horizontally neighboring" one another means and includes features of the disclosed identity (or identities) that are located most horizontally proximate (e.g., horizontally closest to) one another.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the phrase "coupled to" refers to structures operatively connected with each other, such as electrically connected through a direct Ohmic connection or through an indirect connection (e.g., by way of another structure).

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, "conductive material" means and includes electrically conductive material such as one or more of a metal (e.g., tungsten (W), titanium (Ti), molybdenum (Mo), niobium (Nb), vanadium (V), hafnium (Hf), tantalum (Ta), chromium (Cr), zirconium (Zr), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), aluminum (Al)), an alloy (e.g., a Co-based alloy, an Fe-based alloy, an Ni-based alloy, an Fe- and Ni-based alloy, a Co- and Ni-based alloy, an Fe- and Co-based alloy, a Co- and Ni- and Fe-based alloy, an Al-based alloy, a Cu-based alloy, a magnesium (Mg)-based alloy, a Ti-based alloy, a steel, a low-carbon steel, a stainless steel), a conductive metal-containing material (e.g., a conductive metal nitride, a conductive metal silicide, a conductive metal carbide, a conductive metal oxide), and a conductively-doped semiconductor material (e.g., conductively-doped polysilicon, conductively-doped germanium (Ge), conductively-doped silicon germanium (SiGe)). In addition, a "conductive structure" means and includes a structure formed of and including conductive material.

As used herein, "insulative material" means and includes electrically insulative material, such as one or more of at least one dielectric oxide material (e.g., one or more of a silicon oxide ($SiO_x$), phosphosilicate glass, borosilicate glass, borophosphosilicate glass, fluorosilicate glass, an aluminum oxide ($AlO_x$), a hafnium oxide ($HfO_x$), a niobium oxide ($NbO_x$), a titanium oxide ($TiO_x$), a zirconium oxide ($ZrO_x$), a tantalum oxide ($TaO_x$), and a magnesium oxide ($MgO_x$)), at least one dielectric nitride material (e.g., a silicon nitride ($SiN_y$)), at least one dielectric oxynitride material (e.g., a silicon oxynitride ($SiO_xN_y$)), at least one dielectric oxycarbide material (e.g., silicon oxycarbide ($SiO_xC_y$)), at least one hydrogenated dielectric oxycarbide material (e.g., hydrogenated silicon oxycarbide ($SiC_xO_yH_z$)), and at least one dielectric carboxynitride material (e.g., a silicon carboxynitride ($SiO_xC_zN_y$)). Formulae including one or more of "x," "y," and "z" herein (e.g., $SiO_x$, $AlO_x$, $HfO_x$, $NbO_x$, $TiO_x$, $SiN_y$, $SiO_xN_y$, $SiO_xC_y$, $SiC_xO_yH_z$, $SiO_xC_zN_y$) represent a material that contains an average ratio of "x" atoms of one element, "y" atoms of another element, and "z" atoms of an additional element (if any) for every one atom of another element (e.g., Si, Al, Hf, Nb, Ti). As the formulae are representative of relative atomic ratios and not strict chemical structure, an insulative material may comprise one or more stoichiometric compounds and/or one or more non-stoichiometric compounds, and values of "x," "y," and "z" (if any) may be integers or may be non-integers. As used herein, the term "non-stoichiometric compound" means and includes a chemical compound with an elemental composition that cannot be represented by a ratio of well-defined natural numbers and is in violation of the law of definite proportions. In addition, an "insulative structure" means and includes a structure formed of and including insulative material.

As used herein, the term "homogeneous" means relative amounts of elements included in a feature (e.g., a material, a structure) do not vary throughout different portions (e.g., different horizontal portions, different vertical portions) of the feature. Conversely, as used herein, the term "heterogeneous" means relative amounts of elements included in a feature (e.g., a material, a structure) vary throughout different portions of the feature. If a feature is heterogeneous, amounts of one or more elements included in the feature may vary stepwise (e.g., change abruptly), or may vary continuously (e.g., change progressively, such as linearly, parabolically) throughout different portions of the feature. The feature may, for example, be formed of and include a stack of at least two different materials.

Unless the context indicates otherwise, the materials described herein may be formed by any suitable technique including, but not limited to, spin coating, blanket coating, chemical vapor deposition (CVD), plasma enhanced CVD (PECVD), atomic layer deposition (ALD), plasma enhanced ALD (PEALD), physical vapor deposition (PVD) (e.g., sputtering), or epitaxial growth. Depending on the specific material to be formed, the technique for depositing or growing the material may be selected by a person of ordinary skill in the art. In addition, unless the context indicates otherwise, removal of materials described herein may be accomplished by any suitable technique including, but not limited to, etching (e.g., dry etching, wet etching, vapor etching), ion milling, abrasive planarization (e.g., chemical-mechanical planarization (CMP)), or other known methods.

FIGS. 1A through 1F are simplified, partial cross-sectional views illustrating different processing stages of a method of forming a microelectronic device (e.g., a memory device, such as a 3D NAND Flash memory device), in accordance with embodiments of the disclosure. With the description provided below, it will be readily apparent to one of ordinary skill in the art that the methods and structures described herein may be used to form various devices and electronic systems.

Referring to FIG. 1A, a first microelectronic device structure 100 may be formed to include a first base structure 102; a source tier 104 over and/or within the first base structure 102; a preliminary stack structure 110 over the source tier 104; cell pillar structures 120 and sacrificial contact structures 122 vertically extending (e.g., in the Z-direction) through the preliminary stack structure 110; and a first isolation material 125 overlying the preliminary stack structure 110. The first microelectronic device structure 100 is also formed to include additional features (e.g., structures, materials, regions, devices), as described in further detail below.

The first base structure 102 of the first microelectronic device structure 100 comprises a base material or construction upon which additional features (e.g., materials, structures, devices) of the first microelectronic device structure 100 are formed. The first base structure 102 may, for example, be formed of and include one or more of a semiconductor material (e.g., one or more of a silicon material, such as monocrystalline silicon or polycrystalline silicon (also referred to herein as "polysilicon"); silicon-germanium; germanium; gallium arsenide; a gallium nitride; gallium phosphide; indium phosphide; indium gallium nitride; and aluminum gallium nitride), a base semiconductor material on a supporting structure, glass material (e.g., one or more of borosilicate glass (BSP), phosphosilicate glass (PSG), fluorosilicate glass (FSG), borophosphosilicate glass (BPSG), aluminosilicate glass, an alkaline earth boro-aluminosilicate glass, quartz, titania silicate glass, and soda-lime glass), and ceramic material (e.g., one or more of poly-aluminum nitride (p-AlN), silicon on poly-aluminum nitride (SOPAN), aluminum nitride (AlN), aluminum oxide (e.g., sapphire; $\alpha$-$Al_2O_3$), and silicon carbide). For example, the first base structure 102 may comprise a conventional silicon substrate (e.g., a conventional silicon wafer), or another bulk substrate comprising a semiconductor material.

The source tier 104 may include at least one source material 106. The source material 106 may be formed of and include conductive material. In some embodiments, the source material 106 is formed of and includes conductively doped semiconductor material, such as a conductively doped form of one or more of a silicon material, such as monocrystalline silicon or polycrystalline silicon; a silicon-germanium material; a germanium material; a gallium arsenide material; a gallium nitride material; and an indium phosphide material. As a non-limiting example, the source material 106 may be formed of and include silicon (e.g., polycrystalline silicon) doped with at least one dopant (e.g., one or more of at least one n-type dopant, at least one p-type dopant, and at least one other dopant). In some embodiments, the source material 106 is formed on an upper surface of the first base structure 102. In additional embodiments, at least one material (e.g., at least one insulative material) is formed between the first base structure 102 and the source material 106. As a non-limiting example, a dielectric oxide material (e.g., $SiO_x$, such as silicon dioxide ($SiO_2$)) may be formed between (e.g., vertically between) the first base structure 102 and the source material 106. In further embodiments, the source material 106 is formed at least partially within the first base structure 102. As a non-limiting example, the source material 106 may comprise a conductively doped region of semiconductor material of the first base structure 102. As another non-limiting example, a first portion the source material 106 may be located above an uppermost surface of the first base structure 102, and a second portion of the source material 106 may be located below an uppermost surface of the first base structure 102. In further embodiments, the source tier 104 is free of the source material 106 at the processing stage of FIG. 1A. For example, the source material 106 may be formed at a subsequent processing stage, as described in further detail below.

The preliminary stack structure 110 may be formed to include sacrificial structures 112, and insulative structures 114 vertically alternating (e.g., in the Z-direction) with the sacrificial structures 112. The sacrificial structures 112 and the insulative structures 114 may be arranged in tiers 116, wherein each of the tiers 116 individually includes at least one of the sacrificial structures 112 vertically neighboring at least one of the insulative structures 114. The preliminary stack structure 110 may be formed to include any desired quantity of the tiers 116, such as greater than or equal to sixteen (16) of the tiers 116, greater than or equal to thirty-two (32) of the tiers 116, greater than or equal to sixty-four (64) of the tiers 116, greater than or equal to one hundred and twenty-eight (128) of the tiers 116, or greater than or equal to two hundred and fifty-six (256) of the tiers 116.

The sacrificial structures 112 of the tiers 116 of the preliminary stack structure 110 may be formed of and include at least one material (e.g., at least one insulative material) that may be selectively removed relative to additional material (e.g., at least one additional insulative material) of the insulative structures 114. A material composition of the sacrificial structures 112 is different than a material composition of the insulative structures 114. The sacrificial structures 112 may be selectively etchable relative to the insulative structures 114 during common (e.g., collective, mutual) exposure to a first etchant, and the insulative structures 114 may be selectively etchable to the sacrificial structures 112 during common exposure to a second, different etchant. As used herein, a material is "selectively etchable" relative to another material if the material exhibits an etch rate that is at least about three times (3×) greater than the etch rate of another material, such as about five times (5×) greater, such as about ten times (10×) greater, about twenty times (20×) greater, or about forty times (40×) greater. As a non-limiting example, the sacrificial structures 112 may be formed of and include insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, each of the sacrificial structures 112 is formed of and includes a dielectric nitride material, such as $SiN_y$ (e.g., $Si_3N_4$). Each of the sacrificial structures 112 may individually be substantially homogeneous or substantially heterogeneous.

The insulative structures 114 of the tiers 116 of the preliminary stack structure 110 may be formed of and include at least one insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, each of the insulative structures 114 is formed of and includes a dielectric oxide material, such as $SiO_x$ (e.g., $SiO_2$). Each of the insulative structures 114 may individually be substantially homogeneous, or may be substantially heterogeneous.

The cell pillar structures 120 may each individually be formed of and include a stack of materials. By way of non-limiting example, each of the cell pillar structures 120 may be formed to include a charge-blocking material, such as first dielectric oxide material (e.g., $SiO_x$, such as $SiO_2$; $AlO_x$, such as $Al_2O_3$); a charge-trapping material, such as a dielectric nitride material (e.g., $SiN_y$, such as $Si_3N_4$); a tunnel dielectric material, such as a second oxide dielectric material (e.g., $SiO_x$, such as $SiO_2$); a channel material, such as a semiconductor material (e.g., silicon, such as polycrystalline Si); and a dielectric fill material (e.g., a dielectric oxide, a dielectric nitride, air). The charge-blocking material may be formed on or over surfaces of the sacrificial structures 112 and the insulative structures 114 of the tiers 116 of the preliminary stack structure 110 at least partially defining horizontal boundaries of the cell pillar structures 120; the charge-trapping material may be horizontally surrounded by the charge-blocking material; the tunnel dielectric material may be horizontally surrounded by the charge-trapping material; the channel material may be horizontally surrounded by the tunnel dielectric material; and the dielectric fill material may be horizontally surrounded by the channel material. As shown in FIG. 1A, the cell pillar structures 120 may be formed to vertically extend (e.g., in the Z-direction) through the preliminary stack structure 110, and to or into the source tier 104 underlying the preliminary stack structure 110. For example, the cell pillar structures 120 may individually vertically extend form an upper surface of the preliminary stack structure 110, through the tiers 116 of the preliminary stack structure 110, and to or into the source material 106 (if formed) of the source tier 104.

The sacrificial contact structures 122 may be formed of and include at least one material (e.g., at least one dielectric material) that may be selectively removed relative to other materials of the first microelectronic device structure 100 and insulative liner material 124 and to additional materials of an assembly formed, in part, from the first microelectronic device structure 100, as described in further detail below. For example, the sacrificial contact structures 122 may be selectively etchable, during common (e.g., collective, mutual) exposure to an etchant, relative to the insulative structures 114, the first isolation material 125, and at least one insulative liner material 124 formed to surround the sacrificial contact structures 122. A material composition of the sacrificial contact structures 122 is different than material composition(s) of the insulative structures 114, the first isolation material 125, and insulative liner material 124. As a non-limiting example, the sacrificial contact structures 122 may be formed of and include at least one insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, the sacrificial contact structures 122 are formed of and include one or more of at least one dielectric nitride material (e.g., $SiN_y$, such as $Si_3N_4$), and at least one dielectric oxynitride material (e.g., $SiO_xN_y$). The sacrificial contact structures 122 may individually be formed to be substantially homogeneous, or the sacrificial contact structures 122 may individually be formed to be heterogeneous.

As shown in FIG. 1A, the sacrificial contact structures 122 may be formed to be horizontally offset (e.g., in the X-direction) from an array of the cell pillar structures 120. In addition, the sacrificial contact structures 122 may be formed to vertically extend (e.g., in the Z-direction) through the preliminary stack structure 110, and to or into the source tier 104 underlying the preliminary stack structure 110. For example, the sacrificial contact structures 122 may individually vertically extend form an upper surface of the preliminary stack structure 110, through the tiers 116 of the preliminary stack structure 110, and to or into the source material 106 (if formed) of the source tier 104. In some embodiments, for an individual sacrificial contact structure 122, a lowermost boundary (e.g., a lowermost surface) thereof is formed to be located vertically below an uppermost boundary (e.g., an uppermost surface) of the source material 106 of the source tier 104. In additional embodiments, for an individual sacrificial contact structure 122, the lowermost boundary of thereof is formed to be located substantially vertically at or above the uppermost boundary of the source material 106 of the source tier 104.

The insulative liner material 124 may be formed to substantially continuously extend over and substantially cover at least side surfaces (e.g., sidewalls) of the sacrificial contact structures 122. The insulative liner material 124 may be horizontally interposed between the sacrificial contact structures 122 and the sacrificial structures 112 (and the insulative structures 114) of the tiers 116 of the preliminary stack structure 110. As shown in FIG. 1A, the insulative liner material 124 may also be formed to substantially continuously extend under and substantially cover lowermost surfaces of the sacrificial contact structures 122. For an individual sacrificial contact structure 122, the lowermost surface thereof may be located on or over the insulative liner material 124. Portions of the insulative liner material 124 substantially continuously extending over and substantially covering the side surfaces of an individual sacrificial contact structure 122 may be integral and continuous with additional portions of the insulative liner material 124 substantially continuously extending under and substantially covering the lowermost surfaces of the sacrificial contact structure 122. The insulative liner material 124 may be formed to exhibit a desired thickness extending outwardly away from neighboring surfaces of the sacrificial contact structures 122. By way of non-limiting example, a thickness of insulative liner material 124 may be greater than or equal to about 8 nm, such as within a range of from about 8 nanometers (nm) to about 20 nm, from about 10 nm to about 18 nm, or from about 10 nm to about 15 nm.

The insulative liner material 124 may be formed of and include at least one insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and a $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). A material composition of the insulative liner material 124 is different than a material composition of the sacrificial contact structures 122, so that the sacrificial contact structures 122 are selectively etchable relative to the insulative liner material 124 during common (e.g., collective, mutual) exposure to an etchant. In some embodiments, each of the insulative liner material 124 is formed of and includes at least one dielectric oxide material (e.g., $SiO_x$, such as $SiO_2$).

The insulative liner material 124 may be formed to vertically extend (e.g., in the Z-direction) through the preliminary stack structure 110, and at least to (e.g., to, into, beyond) the source tier 104 underlying the preliminary stack structure 110. For example, the insulative liner material 124 may individually vertically extend form an upper surface of the preliminary stack structure 110, through the tiers 116 of the preliminary stack structure 110, and to, into, or beyond the source material 106 (if formed) of the source tier 104. In some embodiments, a lowermost boundary (e.g., a lowermost surface) of the insulative liner material 124 is formed to be located vertically below an uppermost boundary (e.g., an uppermost surface) of the source material 106 of the source tier 104. In additional embodiments, the lowermost boundary of the insulative liner material 124 is formed to be located substantially vertically at or above the uppermost boundary of the source material 106 of the source tier 104.

With continued reference to FIG. 1A, the first isolation material 125 may be formed on or over the preliminary stack structure 110. The first isolation material 125 may exhibit a substantially planar uppermost boundary (e.g., uppermost surface) horizontally extending substantially continuously over a substantially an entirety of a horizontal area (e.g., in the XY-plane) of the preliminary stack structure 110 including the cell pillar structures 120 and the sacrificial contact structures 122 therein. The first isolation material 125 may be employed for a subsequent bonding process, as described in further detail below. The first isolation material 125 may be formed of and include at least one insulative material. A material composition of the first isolation material 125 may be substantially the same as a material composition of the insulative structures 114 of the tiers 116 of the preliminary stack structure 110, or may be different than the material composition of the insulative structures 114. The first isolation material 125 may comprise a portion of the insulative material of the insulative structures 114 vertically overlying the sacrificial structure(s) 112 of an uppermost tier 116 of the preliminary stack structure 110, and/or may comprise additional insulative material formed on or over the sacrificial structure(s) 112 of an uppermost tier 116 of the preliminary stack structure 110. In some embodiments, the first isolation material 125 is formed of and includes a dielectric oxide material, such as $SiO_x$ (e.g., $SiO_2$). The first isolation material 125 may be substantially homogeneous, or the first isolation material 125 may be heterogeneous.

Figure 1B:
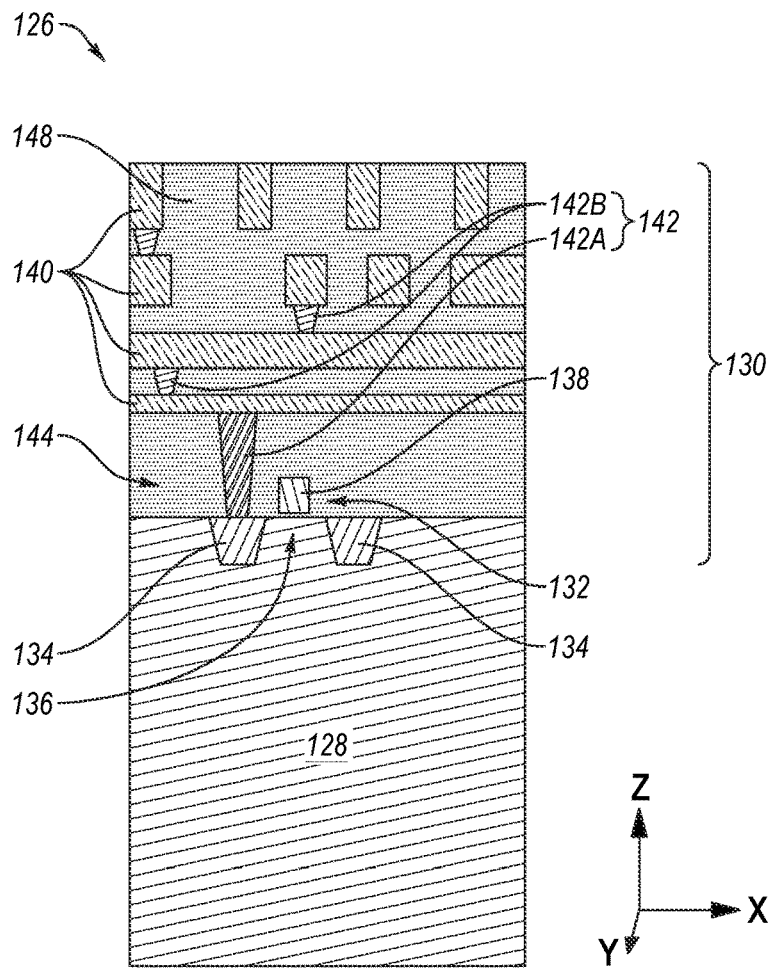

Referring next to FIG. 1B, a second microelectronic device structure 126 to subsequently be attached to the first microelectronic device structure 100 (FIG. 1A) may be formed. The second microelectronic device structure 126 may be formed to include a second base structure 128, and a control logic region 130 at least partially overlying the second base structure 128. The control logic region 130 may include transistors 132, first routing structures 140, first contact structures 142, and a second isolation material 148. The control logic region 130 of the second microelectronic device structure 126 may employed within a microelectronic device (e.g., a memory device, such as a 3D NAND Flash memory device) to subsequently be formed using the second microelectronic device structure 126 and the first microelectronic device structure 100 (FIG. 1A), as described in further detail below. The transistors 132, the first routing structures 140, and the first contact structures 142 of the second microelectronic device structure 126 may form control logic circuitry of various control logic devices 144 of the control logic region 130, as also described in further detail below.

The second base structure 128 (e.g., semiconductor wafer) of the second microelectronic device structure 126 comprises a base material or construction upon which additional features (e.g., materials, structures, devices) of the second microelectronic device structure 126 are formed. The second base structure 128 may comprise a semiconductor structure (e.g., a semiconductor wafer), or a base semiconductor material on a supporting structure. For example, the second base structure 128 may comprise a conventional silicon substrate (e.g., a conventional silicon wafer), or another bulk substrate comprising a semiconductor material. In some embodiments, the second base structure 128 comprises a silicon wafer. In addition, the second base structure 128 may include one or more layers, structures, and/or regions formed therein and/or thereon. For example, the second base structure 128 may include conductively doped regions and undoped regions.

The transistors 132 of the control logic region 130 may be formed to vertically intervene between portions of the second base structure 128 and the first routing structures 140 of the control logic region 130. The transistors 132 may be formed to include conductively doped regions 134 (e.g., serving as source regions and drain regions of the transistors 132) within the second base structure 128, channel regions 136 within the second base structure 128 and horizontally interposed between the conductively doped regions 134, and gate structures 138 vertically overlying the channel regions 136. The transistors 132 may also include gate dielectric material (e.g., a dielectric oxide) formed to vertically intervene (e.g., in the Z-direction) between the gate structures 138 and the channel regions 136.

For the transistors 132 of the control logic region 130, the conductively doped regions 134 within the second base structure 128 may be doped with one or more desirable dopants (e.g., chemical species). In some embodiments, the conductively doped regions 134 of an individual transistor 132 within the control logic region 130 are doped with at least one N-type dopant (e.g., one or more of phosphorus, arsenic, antimony, and bismuth). In some of such embodiments, the channel region 136 of the transistor 132 is doped with at least one P-type dopant (e.g., one or more of boron, aluminum, and gallium). In some other of such embodiments, the channel region 136 of the transistor 132 is substantially undoped. In additional embodiments, the conductively doped regions 134 of an individual transistor 132 within the control logic region 130 are doped with at least one P-type dopant (e.g., one or more of boron, aluminum, and gallium). In some of such additional embodiments, the channel region 136 of the transistor 132 is doped with at least one N-type dopant (e.g., one or more of phosphorus, arsenic, antimony, and bismuth). In some other of such additional embodiments, channel region 136 of the transistor 132 is substantially undoped.

The gate structures 138 may individually horizontally extend (e.g., in the Y-direction) between and be employed by multiple transistors 132 of the control logic region 130. The gate structures 138 may be formed of and include conductive material. By way of non-limiting example, the gate structures 138 may be formed of and include one or more of at least one metal, at least one alloy, and at least one conductive metal-containing material (e.g., a conductive metal nitride, a conductive metal silicide, a conductive metal carbide, a conductive metal oxide). The gate structures 138 may individually be substantially homogeneous, or the gate structures 138 may individually be heterogeneous.

The first routing structures 140 may vertically overlie (e.g., in the Z-direction) the second base structure 128, and may be electrically connected to at least some of the transistors 132. The first routing structures 140 may serve as local routing structures for a microelectronic device to subsequently be formed using the second microelectronic device structure 126 and the first microelectronic device structure 100 (FIG. 1A). A first group 142A of the first contact structures 142 may vertically extend between and couple at least some of the transistors 132 to one or more of the first routing structures 140. In addition, a second group 142B of the first contact structures 142 may vertically extend between and couple some of the first routing structures 140 to one another.

The first routing structures 140 may each individually be formed of and include conductive material. By way of non-limiting example, the first routing structures 140 may be formed of and include one or more of at least one metal, at least one alloy, and at least one conductive metal-containing material (e.g., a conductive metal nitride, a conductive metal silicide, a conductive metal carbide, a conductive metal oxide). In some embodiments, the first routing structures 140 are individually formed of and include Cu. In additional embodiments, the first routing structures 140 are individually formed of and include W.

The first contact structures 142 (including the first group 142A and the second group 142B thereof) may each individually be formed of and include conductive material. By way of non-limiting example, the first routing structures 140 may be formed of and include one or more of at least one metal, at least one alloy, and at least one conductive metal-containing material (e.g., a conductive metal nitride, a conductive metal silicide, a conductive metal carbide, a conductive metal oxide). In some embodiments, the first contact structures 142 are individually formed of and include Cu. In additional embodiments, the first contact structures 142 are individually formed of and include W. In further embodiments, the first contact structures 142 of the first group 142A of the first contact structures 142 are individually formed of and include first conductive material (e.g., W); and the first contact structures 142 of the second group 142B of the first contact structures 142 are individually formed of and include a second, different conductive material (e.g., Cu).

As previously mentioned, transistors 132, the first routing structures 140, and the first contact structures 142 may form control logic circuitry of various control logic devices 144 of the control logic region 130. In some embodiments, the control logic devices 144 comprise complementary metal-oxide-semiconductor (CMOS) circuitry. The control logic devices 144 may be configured to control various operations of other components (e.g., memory cells) of a microelectronic device (e.g., a memory device, such as a 3D NAND Flash memory device) to subsequently be formed using the second microelectronic device structure 126 and the first microelectronic device structure 100 (FIG. 1A). As a non-limiting example, the control logic devices 144 may include one or more (e.g., each) of charge pumps (e.g., $V_{CCP}$ charge pumps, $V_{NEGWL}$ charge pumps, DVC2 charge pumps), delay-locked loop (DLL) circuitry (e.g., ring oscillators), $V_{dd}$ regulators, drivers (e.g., string drivers), page buffers, decoders (e.g., local deck decoders, column decoders, row decoders), sense amplifiers (e.g., equalization (EQ) amplifiers, isolation (ISO) amplifiers, NMOS sense amplifiers (NSAs), PMOS sense amplifiers (PSAs)), repair circuitry (e.g., column repair circuitry, row repair circuitry), I/O devices (e.g., local I/O devices), memory test devices, array multiplexers (MUX), error checking and correction (ECC) devices, self-refresh/wear leveling devices, and other chip/deck control circuitry.

Still referring to FIG. 1B, second isolation material 148 may be formed to cover and surround portions of the transistors 132, the first routing structures 140, and the first contact structures 142. In some embodiments, the second isolation material 148 is formed such that an uppermost surface thereof is substantially coplanar with uppermost surfaces of uppermost first routing structures 140 of the second microelectronic device structure 126. Accordingly, the uppermost surfaces of the first routing structures 140 are not covered by the second isolation material 148. In additional embodiments, the second isolation material 148 is formed to substantially cover the uppermost surfaces of the uppermost first routing structures 140 of the second microelectronic device structure 126, such that the uppermost surface of the second isolation material 148 vertically overlies the uppermost surfaces of the uppermost first routing structures 140.

The second isolation material 148 may be formed of and include at least one insulative material. By way of non-limiting example, the second isolation material 148 may be formed of and include one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, and $TiO_x$), at least one dielectric nitride material (e.g., $SiN_y$), at least one dielectric oxynitride material (e.g., $SiO_xN_y$), at least one dielectric carboxynitride material (e.g., $SiO_xC_zN_y$), and amorphous carbon. A material composition of the second isolation material 148 may be substantially the same as a material composition of the first isolation material 125 (FIG. 1A) of the first microelectronic device structure 100 (FIG. 1A), or the material composition of the second isolation material 148 may be different than the material composition of the first isolation material 125 (FIG. 1A) of the first microelectronic device structure 100 (FIG. 1A). In some embodiments, the second isolation material 148 is formed of and includes $SiO_x$ (e.g., $SiO_2$). The second isolation material 148 may be substantially homogeneous, or the second isolation material 148 may be heterogeneous.

Figure 1C:
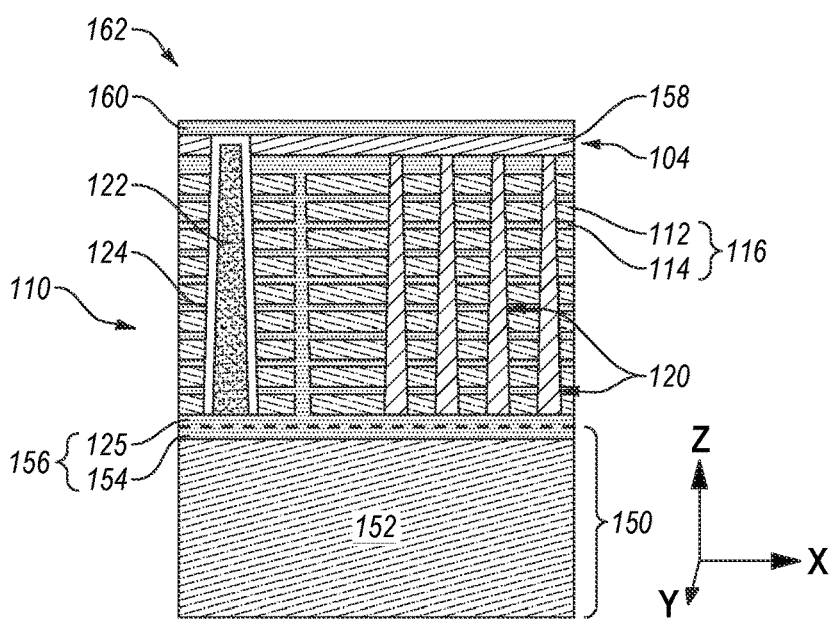

Referring next to FIG. 1C, the first microelectronic device structure 100 (FIG. 1A) may be attached (e.g., bonded) to a third microelectronic device structure 150 to form a first microelectronic device structure assembly 162. The third microelectronic device structure 150 may include a third base structure 152, and a third isolation material 154 on, over, or within the third base structure 152. The first microelectronic device structure assembly 162 may be inverted (e.g., flipped upside down in the Z-direction), and at least a portion of the first base structure 102 (FIG. 1A) may be removed. One or more source structure(s) 158 may then be formed within the source tier 104, and a fourth isolation material 160 may be formed on or over the source structure(s) 158.

The third base structure 152 of the third microelectronic device structure 150 comprises a base material or construction upon which additional features (e.g., materials, structures, devices) are formed. In some embodiments, the third base structure 152 comprises a wafer. The third base structure 152 may be formed of and include one or more of semiconductor material (e.g., one or more of a silicon material, such as monocrystalline silicon or polycrystalline silicon (also referred to herein as "polysilicon"); silicon-germanium; germanium; gallium arsenide; a gallium nitride; gallium phosphide; indium phosphide; indium gallium nitride; and aluminum gallium nitride), a base semiconductor material on a supporting structure, glass material (e.g., one or more of borosilicate glass (BSP), phosphosilicate glass (PSG), fluorosilicate glass (FSG), borophosphosilicate glass (BPSG), aluminosilicate glass, an alkaline earth boro-aluminosilicate glass, quartz, titania silicate glass, and soda-lime glass), and ceramic material (e.g., one or more of poly-aluminum nitride (p-AlN), silicon on poly-aluminum nitride (SOPAN), aluminum nitride (AlN), aluminum oxide (e.g., sapphire; $\alpha$-$Al_2O_3$), and silicon carbide). By way of non-limiting example, the third base structure 152 may comprise a semiconductor wafer (e.g., a silicon wafer), a glass wafer, or a ceramic wafer. The third base structure 152 may include one or more layers, structures, and/or regions formed therein and/or thereon. The third base structure 152 may be configured to facilitate safe handling of the first microelectronic device structure assembly 162 for subsequent attachment to the second microelectronic device structure 126, as described in further detail below.

The third isolation material 154 of the third microelectronic device structure 150 may be formed of and include at least one insulative material. A material composition of the third isolation material 154 of the third microelectronic device structure 150 may be substantially the same as a material composition of the first isolation material 125 of the first microelectronic device structure 100 (FIG. 1A), or the material composition of the third isolation material 154 may be different than the material composition of the first isolation material 125. In some embodiments, the third isolation material 154 is formed of and includes a dielectric oxide material, such as $SiO_x$ (e.g., $SiO_2$). The third isolation material 154 may be substantially homogeneous, or the third isolation material 154 may be heterogeneous.

To attach the third microelectronic device structure 150 to the first microelectronic device structure 100 (FIG. 1A), the third microelectronic device structure 150 may be vertically inverted (e.g., flipped upside down in the Z-direction), the third isolation material 154 thereof may be provided in physical contact with the first isolation material 125 of the first microelectronic device structure 100 (FIG. 1A), and the third isolation material 154 and the first isolation material 125 may be exposed to annealing conditions to form bonds (e.g., oxide-to-oxide bonds) between the third isolation material 154 and the first isolation material 125. By way of non-limiting example, the third isolation material 154 and the first isolation material 125 may be exposed to a temperature greater than or equal to about 400° C. (e.g., within a range of from about 400° C. to about 800° C., greater than about 800° C.) to form oxide-to-oxide bonds between the third isolation material 154 and the first isolation material 125. In some embodiments, the first isolation material 125 and the third isolation material 154 are exposed to at least one temperature greater than about 800° C. to form oxide-to-oxide bonds between the first isolation material 125 and the third isolation material 154.

Bonding the third isolation material 154 to the first isolation material 125 may form a first connected isolation structure 156. While in FIG. 1C, the first isolation material 125 and the third isolation material 154 of the first connected isolation structure 156 are distinguished from one another by way of a dashed line, the first isolation material 125 and the third isolation material 154 may be integral and continuous with one another. Put another way, the first connected isolation structure 156 may be a substantially monolithic structure including the first isolation material 125 as a first region (e.g., a vertically upper region) thereof, and the third isolation material 154 as a second region (e.g., a vertically lower region) thereof. For the first connected isolation structure 156, the first isolation material 125 thereof may be attached to the third isolation material 154 thereof without a bond line.

Still referring to FIG. 1C, after attaching the third microelectronic device structure 150 to the first microelectronic device structure 100 (FIG. 1A), the first base structure 102 (FIG. 1A) may be at least partially removed (e.g., through conventional detachment processes and/or conventional grinding processes). The material removal process may expose (e.g., uncover) material (e.g., the source material 106 (FIG. 1A)) of the source tier 104 of the first microelectronic device structure 100 (FIG. 1A), as well as portions of the insulative liner material 124. The material of the source tier 104 may be acted upon (e.g., annealed, etched) to form the source structure(s) 158 of the source tier 104, as described in further detail below. As shown in FIG. 1C, uppermost boundaries (e.g., uppermost surfaces) of the source structure(s) 158 may be formed to be substantially coplanar with uppermost boundaries (e.g., uppermost surfaces) of the portions of the insulative liner material 124. The source structure(s) 158 may be coupled to the cell pillar structures 120.

Following the removal of the first base structure 102 (FIG. 1A), regions of the source material 106 (FIG. 1A) (and, optionally, one or more additional materials, as described in further detail below), if present, may be removed (e.g., etched) to form the source structure(s) 158 of the source tier 104. Optionally, an additional amount (e.g., additional volume) of source material (e.g., doped polycrystalline silicon) and/or strapping material (e.g., conductive material, such as metallic material comprising one or more of at least one metal, at least one alloy, and at least one conductive metal-containing material) may be formed on or over the source material 106 following the removal of the first base structure 102 (FIG. 1A) and prior to the material removal process to the source structure(s) 158. If formed, the source material and/or the strapping material may become portions of the source structure(s) 158 of the source tier 104. In some embodiments, the strapping material is formed, and is formed of and includes one or more of tungsten (W), tungsten nitride ($WN_x$), and tungsten silicide ($WSi_x$). In addition, the source material 106 (FIG. 1A) (and the additional amount of source material, if any) may, optionally, be annealed (e.g., thermally annealed) before and/or after the formation of the strapping material (if any). Annealing the source material 106 (FIG. 1A) (and the additional amount of source material, if any) may, for example, facilitate or enhance dopant activation within the source material 106 (FIG. 1A) (and the additional amount of source material, if any).

As previously discussed herein, in some embodiments, the source material 106 (FIG. 1A) is not formed at the processing stage previously described with reference to FIG. 1A. Instead, source material for the source structure(s) 158 may be formed after the removal of the first base structure 102 (FIG. 1A). In some such embodiments, the source material is formed to substantially cover portions of the insulative liner material 124 (and the sacrificial contact structures 122 surrounded thereby) shown vertically extending through the source structure(s) 158 in FIG. 1A. Portions of the source material vertically overlying and within horizontal areas (e.g., in the XY-plane) of the insulative liner material 124 (and the sacrificial contact structures 122) may be removed (e.g., etched) during the formation of the source structure(s) 158 to expose (e.g., uncover) the portions of the insulative liner material 124. Accordingly, uppermost boundaries (e.g., uppermost surfaces) of the source structure(s) 158 may vertically overlie uppermost boundaries (e.g., uppermost surfaces) of the insulative liner material 124. In such embodiments, the fourth isolation material 160 subsequently formed on or over the source structure(s) 158 fills (e.g., substantially fills) openings vertically extending through the source structure(s) 158 as a result of the material removal process. In additional embodiments, portions of the source material vertically overlying and within horizontal areas (e.g., in the XY-plane) of the insulative liner material 124 (and the sacrificial contact structures 122) are not removed (e.g., are maintained) during the formation of the source structure(s) 158. In such embodiments, portions of the source structure(s) 158 vertically overlying and within horizontal areas of the insulative liner material 124 (and the sacrificial contact structures 122) are removed (e.g., etched) at a subsequent processing stage, such as the processing stage described hereinbelow with reference to FIG. 1E.

In addition, while the insulative liner material 124 and the sacrificial contact structures 122 have been described herein as being formed at the processing stage of FIG. 1A, the disclosure is not so limited. The insulative liner material 124 and the sacrificial contact structures 122 may, for example, be formed at the processing stage of FIG. 1C. For example, following the removal of the first base structure 102 (FIG. 1A), contact openings may be formed to vertically extend through the source material 106 (FIG. 1A) (and/or source material formed after the removal of the first base structure 102 (FIG. 1A)) and the preliminary stack structure 110, and to or into the first connected isolation structure 156. Thereafter, the insulative liner material 124 and the sacrificial contact structures 122 may be formed within the contact openings. In such embodiments, tapering of the insulative liner material 124 and the sacrificial contact structures 122 may be reversed relative to how the tapering is depicted in FIG. 1C. For example, a horizontal area (e.g., in the XY-plane) of an individual sacrificial contact structure 122 may decrease in a direction (e.g., in the negative Z-direction) heading towards the first connected isolation structure 156, rather than increasing in the manner depicted in FIG. 1C.

Still referring to FIG. 1C, the source structure(s) 158 of the source tier 104 may be coupled to the cell pillar structures 120. In some embodiments, the source structure(s) 158 directly physically contacts the cell pillar structures 120. In additional embodiments, conductive contact structures may be formed to vertically intervene between the source structure(s) 158 and the cell pillar structures 120. In addition, the source structure(s) 158 may subsequently be coupled to additional features of a microelectronic device (e.g., a memory device, such as a 3D NAND Flash memory device) to be formed using the first microelectronic device structure assembly 162, as described in further detail below.

With continued reference to FIG. 1C, the fourth isolation material 160 may at least be formed on or over uppermost surfaces of the source structure(s) 158. In some embodiments, the fourth isolation material 160 is also formed on uppermost surfaces of the insulative liner material 124. The fourth isolation material 160 may exhibit a substantially planar uppermost boundary (e.g., uppermost surface) horizontally extending substantially continuously over a substantially an entirety of a horizontal area (e.g., in the XY-plane) of the preliminary stack structure 110 including the cell pillar structures 120 and the sacrificial contact structures 122 therein. The fourth isolation material 160 may be employed for a subsequent bonding process, as described in further detail below. The fourth isolation material 160 may be formed of and include at least one insulative material. A material composition of the fourth isolation material 160 may be substantially the same as a material composition of the second isolation material 148 (FIG. 1B) of the second microelectronic device structure 126 (FIG. 1B), or may be different than the material composition of the second isolation material 148 (FIG. 1B) of the second microelectronic device structure 126 (FIG. 1B). In some embodiments, the fourth isolation material 160 is formed of and includes a dielectric oxide material, such as $SiO_x$ (e.g., $SiO_2$). The fourth isolation material 160 may be substantially homogeneous, or the fourth isolation material 160 may be heterogeneous.

Figure 1D:
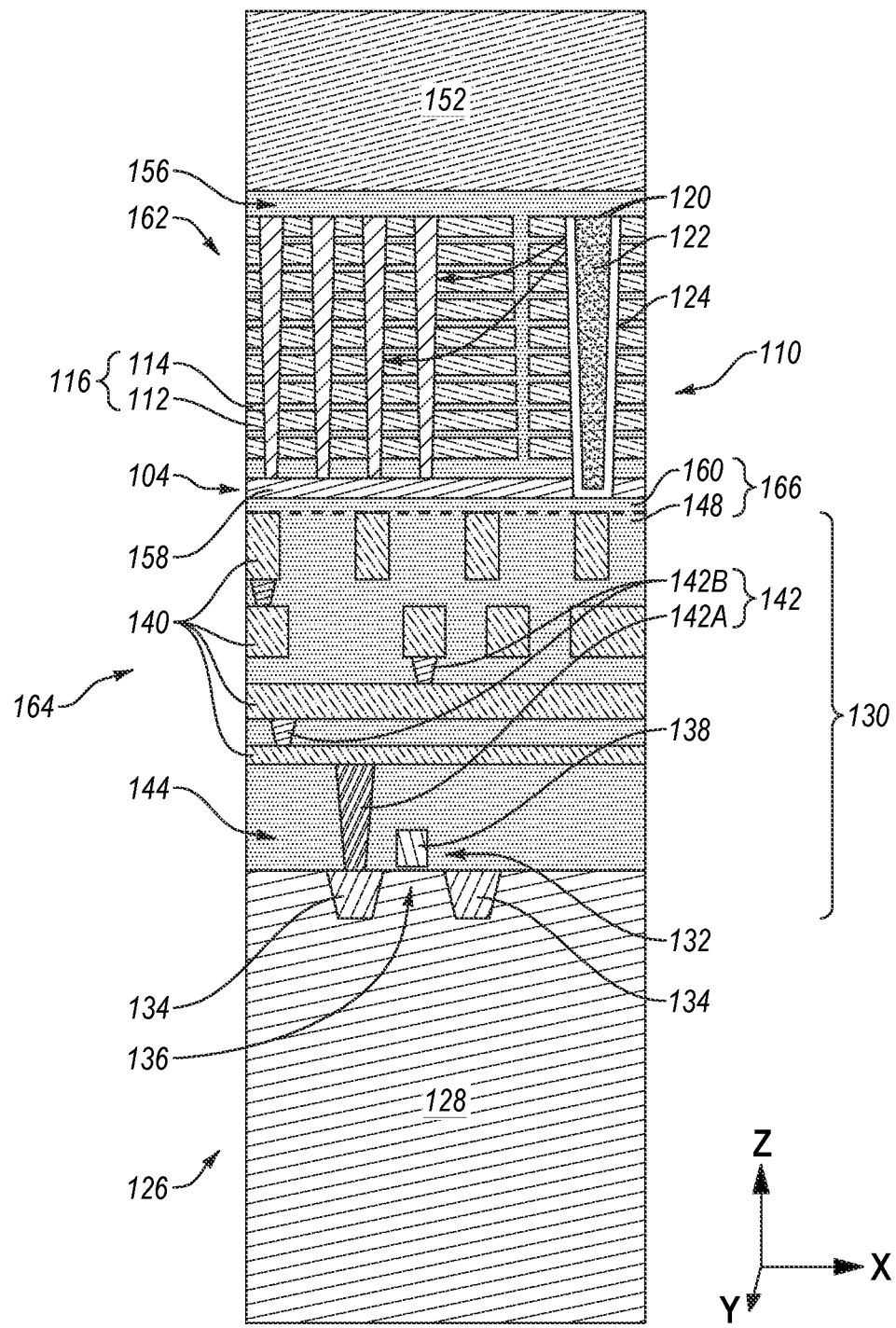

Referring next to FIG. 1D, following the formation of the fourth isolation material 160, the first microelectronic device structure assembly 162 may be vertically inverted (e.g., flipped upside down in the Z-direction) and attached (e.g., bonded) to the second microelectronic device structure 126 to form a second microelectronic device structure assembly 164. Alternatively, the second microelectronic device structure 126 may be vertically inverted (e.g., flipped upside down in the Z-direction) and attached to the first microelectronic device structure assembly 162 to form the second microelectronic device structure assembly 164.

To attach the first microelectronic device structure assembly 162 to the second microelectronic device structure 126, the fourth isolation material 160 of the first microelectronic device structure assembly 162 may be brought into physical contact with at least the second isolation material 148 of the second microelectronic device structure 126. Thereafter, the fourth isolation material 160 and the second isolation material 148 may be exposed to annealing conditions to form bonds (e.g., oxide-to-oxide bonds) between the fourth isolation material 160 and the second isolation material 148. By way of non-limiting example, the fourth isolation material 160 and the second isolation material 148 may be exposed to a temperature greater than or equal to about 400° C. (e.g., within a range of from about 400° C. to about 800° C., greater than about 800° C.) to form oxide-to-oxide bonds between the fourth isolation material 160 and the second isolation material 148. In some embodiments, the fourth isolation material 160 and the second isolation material 148 are exposed to at least one temperature greater than about 800° C. to form oxide-to-oxide bonds between the fourth isolation material 160 and the second isolation material 148.

Bonding the fourth isolation material 160 to the second isolation material 148 may form a second connected isolation structure 166. While in FIG. 1D, the fourth isolation material 160 and the second isolation material 148 of the second connected isolation structure 166 are distinguished from one another by way of a dashed line, the fourth isolation material 160 and the second isolation material 148 may be integral and continuous with one another. Put another way, the second connected isolation structure 166 may be a substantially monolithic structure including the fourth isolation material 160 as a first region (e.g., a vertically upper region) thereof, and the second isolation material 148 as a second region (e.g., a vertically lower region) thereof. For the second connected isolation structure 166, the fourth isolation material 160 thereof may be attached to the second isolation material 148 thereof without a bond line.

As shown in FIG. 1D, in some embodiments, the fourth isolation material 160 directly physically contacts uppermost first routing structures 140 of the second microelectronic device structure 126. In additional embodiments, such as embodiments where the second isolation material 148 is formed to substantially cover the uppermost surfaces of the uppermost first routing structures 140, the fourth isolation material 160 does not directly physically contact the uppermost first routing structures 140. For example, the second isolation material 148 (e.g., serving as a lower region of the second connected isolation structure 166) may be interposed between the uppermost first routing structures 140 and the fourth isolation material 160 (e.g., serving as an upper region of the second connected isolation structure 166).

Figure 1E:
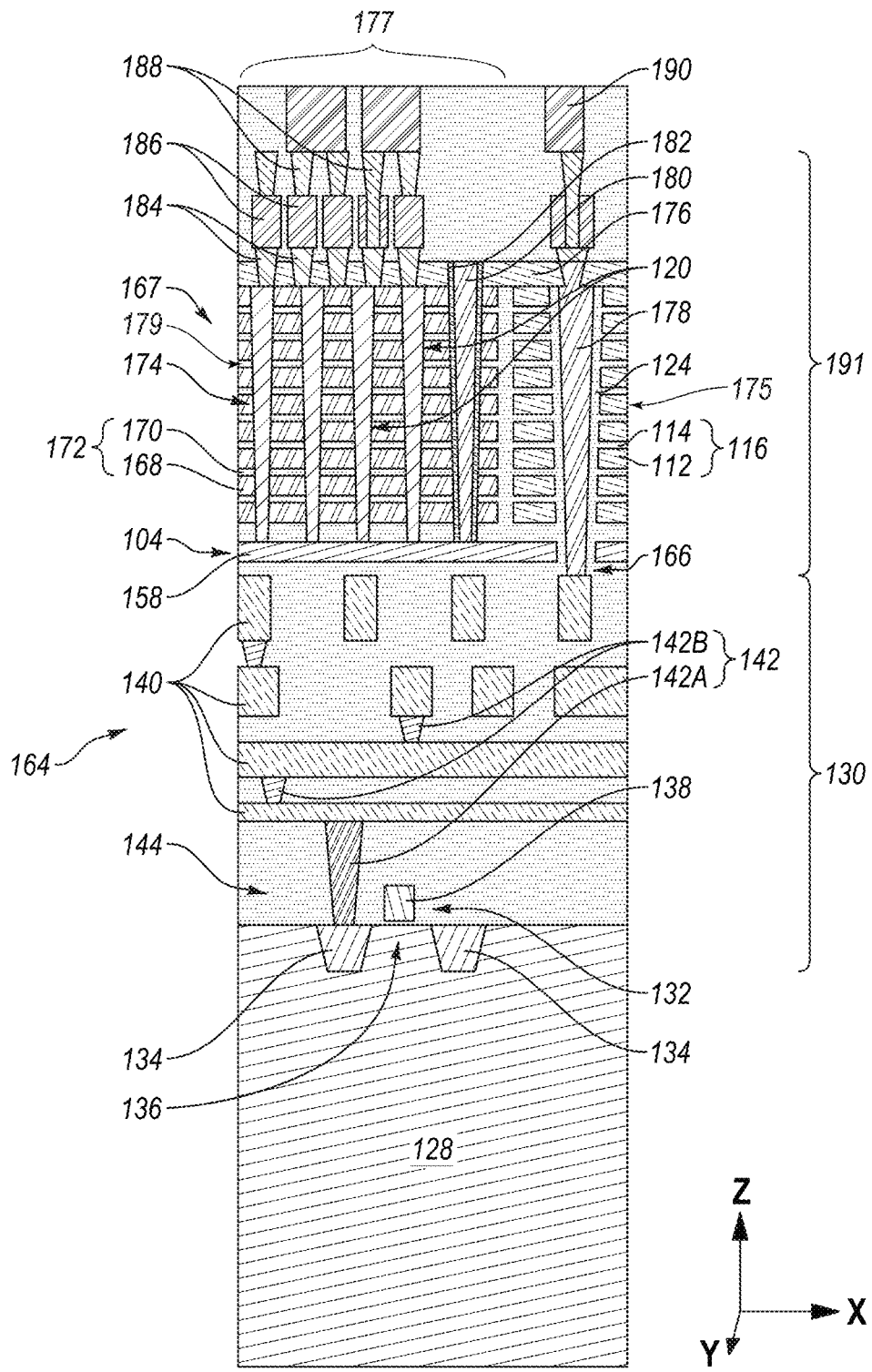

Referring next to FIG. 1E, the third base structure 152 (FIG. 1D) and at least a portion of the first connected isolation structure 156 (FIG. 1D) may be removed, and a stack structure 167 may be formed from the preliminary stack structure 110 (FIG. 1D). In addition, second contact structures 178 may be formed to vertically extend to some of first routing structures 140 within the control logic region 130 using the sacrificial contact structures 122 (FIG. 1D), and third contact structures 180 may be formed to vertically extend through the stack structure 167 and to the source structure(s) 158 within the source tier 104. Furthermore, conductive line structures 184 may be formed over the stack structure 167, insulative line structures 186 may be formed over the conductive line structures 184, and fourth contact structures 188 may be formed to vertically extend through the insulative line structures 186 and to the conductive line structures 184. First conductive pad structures 190 may then be formed over and in electrical communication with the fourth contact structures 188.

The third base structure 152 (FIG. 1D) and the first connected isolation structure 156 (FIG. 1D) may be removed through a conventional material removal process, such as one or more of a conventional detachment process and a conventional grinding process. In some embodiments, the material removal process substantially removes the third base structure 152 (FIG. 1D) and the first connected isolation structure 156 (FIG. 1D), to expose the preliminary stack structure 110 (FIG. 1D), the sacrificial contact structures 122 (FIG. 1D), the insulative liner material 124, and the cell pillar structures 120. In additional embodiments, at least some of the first connected isolation structure 156 (FIG. 1D) remains following the material removal process. In some such embodiments, portions of the first connected isolation structure 156 (FIG. 1D) vertically overlying and within horizontal areas of the sacrificial contact structures 122 (FIG. 1D) may be removed to expose the sacrificial contact structures 122 (FIG. 1D).

Referring to FIG. 1E, following the removal of at least the third base structure 152 (FIG. 1D), the second microelectronic device structure assembly 164 may be subjected to so called "replacement gate" or "gate last" processing acts to at least partially replace the sacrificial structures 112 (FIG. 1D) of the preliminary stack structure 110 (FIG. 1D) with conductive structures 168 and form the stack structure 167. The stack structure 167 may be formed to include the conductive structures 168, and additional insulative structures 170 vertically alternating (e.g., in the Z-direction) with the conductive structures 168. The conductive structures 168 and the additional insulative structures 170 may be arranged in tiers 172, wherein each of the tiers 172 individually includes at least one of the conductive structures 168 vertically neighboring at least one of the additional insulative structures 170.

The conductive structures 168 of the tiers 172 of the stack structure 167 may be formed of and include conductive material. By way of non-limiting example, the conductive structures 168 may each individually be formed of and include a metallic material comprising one or more of at least one metal, at least one alloy, and at least one conductive metal-containing material (e.g., a conductive metal nitride, a conductive metal silicide, a conductive metal carbide, a conductive metal oxide). In some embodiments, the conductive structures 168 are formed of and include W. Each of the conductive structures 168 may individually be substantially homogeneous, or one or more of the conductive structures 168 may individually be substantially heterogeneous.

Optionally, one or more liner materials (e.g., insulative liner material(s), conductive liner material(s)) may be formed around the conductive structures 168. The liner material(s) may, for example, be formed of and include one or more a metal (e.g., titanium, tantalum), an alloy, a metal nitride (e.g., tungsten nitride, titanium nitride, tantalum nitride), and a metal oxide (e.g., aluminum oxide). In some embodiments, the liner material(s) comprise at least one conductive material employed as a seed material for the formation of the conductive structures 168. In some embodiments, the liner material(s) comprise titanium nitride. In further embodiments, the liner material(s) further includes aluminum oxide. As a non-limiting example, aluminum oxide may be formed directly adjacent the insulative structures 114, titanium nitride may be formed directly adjacent the aluminum oxide, and tungsten may be formed directly adjacent the titanium nitride. For clarity and ease of understanding the description, the liner material(s) are not illustrated in FIG. 1E, but it will be understood that the liner material(s) may be disposed around the conductive structures 168.

The additional insulative structures 170 of the tiers 172 of the stack structure 167 may correspond to remainders (e.g., remaining portions, unremoved portions) of insulative structures 114 (FIG. 1D) of the preliminary stack structure 110 (FIG. 1D) following the "replacement gate" processing acts. Accordingly, the additional insulative structures 170 may be formed of and include at least one insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, each of the additional insulative structures 170 is formed of and includes a dielectric oxide material, such as $SiO_x$ (e.g., $SiO_2$).

To form the stack structure 167 using replacement gate processing acts, slots (e.g., slits, trenches) may be formed to vertically extend through the preliminary stack structure 110 (FIG. 1D) to form discrete blocks. Thereafter, portions of the sacrificial structures 112 (FIG. 1D) of the preliminary stack structure 110 (FIG. 1D) may be selectively removed (e.g., selectively etched and exhumed) through the slots, and replaced with conductive material to form the conductive structures 168. Some of the conductive structures 168 may function as access line structures (e.g., word line structures) for a microelectronic device (e.g., a memory device, such as a 3D NAND Flash memory device) to subsequently be formed using the first microelectronic device structure 100, and other of the conductive structures 168 may function as select gate structures for the subsequently formed microelectronic device. Following the formation of the conductive structures 168 the slots may be filled with dielectric material.

Still referring to FIG. 1E, optionally one or more section(s) 175 (e.g., horizontal section(s)) of the preliminary stack structure 110 (FIG. 1D) may not be subjected to replacement gate processing acts. Such section(s) 175 may, for example, be positioned outside of a horizontal area 177 (e.g., in the XY-plane) of an array of the cell pillar structures 120. Within section(s) 175 of the preliminary stack structure 110 (FIG. 1D) not subjected to replacement gate processing acts, the tiers 116 of the sacrificial structures 112 and the insulative structures 114 may be maintained. As a result, the stack structure 167 formed from the preliminary stack structure 110 (FIG. 1D) may include one or more first section(s) 179 including the tiers 172 of the conductive structures 168 and the additional insulative structures 170, and one or more second section(s) 175 horizontally offset from the first section(s) 179 and including the tiers 116 of the sacrificial structures 112 and the insulative structures 114. In some such embodiments, the cell pillar structures 120 are positioned within first section(s) 179 of the stack structure 167 including the tiers 172 of the conductive structures 168 and the additional insulative structures 170; and the one or more of the second contact structures 178 and the third contact structures 180 are formed to be positioned within the second section(s) 175 of the stack structure 167 including the tiers 116 of the sacrificial structures 112 and the insulative structures 114. For example, as shown in FIG. 1E, the second contact structures 178 may be formed to vertically extend through and be horizontally surrounded by the tiers 116 of the sacrificial structures 112 and the insulative structures 114 within the stack structure 167. In additional embodiments, the stack structure 167 is formed to be substantially free of any of the tiers 116 of the sacrificial structures 112 and the insulative structures 114 following replacement gate processing acts. In such embodiments, the cell pillar structures 120, the second contact structures 178, and the third contact structures 180 each vertically extend through and are horizontally surrounded by the tiers 172 of the conductive structures 168 and the additional insulative structures 170.

With continued reference to FIG. 1E, intersections of the cell pillar structures 120 and the conductive structures 168 of the tiers 172 of the stack structure 167 may define vertically extending strings of memory cells 174 coupled in series with one another within the preliminary stack structure 110. In some embodiments, the memory cells 174 formed at the intersections of the conductive structures 168 and the cell pillar structures 120 within different tiers 172 of the stack structure 167 comprise so-called "MONOS" (metal-oxide-nitride-oxide-semiconductor) memory cells. In additional embodiments, the memory cells 174 comprise so-called "TANOS" (tantalum nitride-aluminum oxide-nitride-oxide-semiconductor) memory cells, or so-called "BETANOS" (band/barrier engineered TANOS) memory cells, each of which are subsets of MONOS memory cells. In further embodiments, the memory cells 174 comprise so-called "floating gate" memory cells including floating gates (e.g., metallic floating gates) as charge storage structures. The floating gates may horizontally intervene between central structures of the cell pillar structures 120 and the conductive structures 168 of the different tiers 172 of the stack structure 167.

As shown in FIG. 1E, the control logic devices 144 within the control logic region 130 may be at least partially (e.g., substantially) positioned within a horizontal area of a memory array including the vertically extending strings of memory cells 174. Accordingly, in some embodiments wherein the control logic devices 144 are formed of and include CMOS circuitry, the control logic region 130 may be characterized as having a "CMOS under Array" ("CuA") configuration.

To form the second contact structures 178, the sacrificial contact structures 122 (FIG. 1D) may be selectively removed (e.g., selectively exhumed) to form contact openings. Thereafter, at least portions of the insulative liner material 124 and the second connected isolation structure 166 vertically interposed between and within horizontal areas of lower ends (e.g., bottoms) of the contact openings may be subjected to a punch-through etch to vertically extend the contact openings and expose portions of some of the first routing structures 140 (e.g., some vertically uppermost first routing structures 140) within the control logic region 130. The second contact structures 178 may then be formed within the extended contact openings, so as to be coupled to the some of the first routing structures 140 (and, hence, to control logic circuitry utilizing the some of the first routing structures 140 coupled to the second contact structures 178).

The sacrificial contact structures 122 (FIG. 1D) may be selectively removed to form contact openings by treating the second microelectronic device structure assembly 164 with at least one etchant (e.g., at least one wet etchant) formulated to selectively remove exposed portions of the sacrificial contact structures 122 (FIG. 1D) without substantially removing other exposed features of the second microelectronic device structure assembly 164, such as exposed portions of the insulative liner material 124. By way of non-limiting example, depending on material compositions of the sacrificial contact structures 122 (FIG. 1D) and the insulative liner material 124, the etchant may comprise one or more of tetramethylammonium hydroxide (TMAH), phosphoric acid ($H_3PO_4$), sulfuric acid ($H_2SO_4$), hydrochloric acid (HCl), nitric acid ($HNO_3$), and another material. In some embodiments wherein the sacrificial contact structures 122 (FIG. 1D) comprise one or more of dielectric nitride material (e.g., $SiN_y$, such as $Si_3N_4$) and dielectric oxynitride material (e.g., $SiO_xN_y$), the sacrificial contact structures 122 (FIG. 1D) are selectively removed relative to the insulative liner material 124 using a wet etchant comprising $H_3PO_4$.

In some embodiments, the punch-through etch employed to vertically extend the contact openings and expose portions of some of the first routing structures 140 removes materials in addition to the insulative liner material 124 and the second connected isolation structure 166. As a non-limiting example, in some embodiments wherein portions of the source structure(s) 158 of the source tier 104 are vertically interposed between and within horizontal areas of lower ends (e.g., bottoms) of the contact openings, the punch-through etch may also remove the source structure(s) 158. In additional embodiments, such as embodiments wherein portions of the source structure(s) 158 are not vertically interposed between and within horizontal areas of lower ends (e.g., bottoms) of the contact openings, the punch-through etch substantially only removes the insulative liner material 124 and the second connected isolation structure 166.

The second contact structures 178 may be formed of and include conductive material. By way of non-limiting example, the second contact structures 178 may each individually be formed of and include one or more of at least one metal, at least one alloy, and at least one conductive metal-containing material (e.g., a conductive metal nitride, a conductive metal silicide, a conductive metal carbide, a conductive metal oxide). In some embodiments, the second contact structures 178 are each individually formed of and include W. Each of the second contact structures 178 may be substantially homogeneous, or one or more of the second contact structures 178 may individually be heterogeneous.

In some embodiments, the filling the extended contact openings with conductive material to form the second contact structures 178 is effectuated substantially concurrent (e.g., substantially simultaneously) with filling void spaces, resulting from removal of the sacrificial structures 112 (FIG. 1E), with conductive material to form the conductive structures 168 of the stack structure 167. Put another way, the replacement gate process used to form the conductive structures 168 may also be used to form the second contact structures 178. In additional embodiments, the second contact structures 178 are not formed at substantially the same time as the conductive structures 168 of the stack structure 167. For example, the second contact structures 178 may be formed after the formation of the conductive structures 168, or the second contact structures 178 may be formed before the formation of the conductive structures 168.

The second contact structures 178 may be formed to vertically extend (e.g., in the Z-direction) through the stack structure 167, and at least to (e.g., to, into) some of the first routing structures 140 (e.g., some vertically uppermost first routing structures 140) within the control logic region 130 underlying the stack structure 167. For example, as shown in FIG. 1E, the second contact structures 178 may individually vertically extend from at least an uppermost boundary (e.g., an uppermost surface) of the stack structure 167, through the tiers 116 (and/or the tiers 172) of the stack structure 167, and to or into a vertically uppermost first routing structure 140 within the control logic region 130. In some embodiments, for an individual second contact structures 178, a lowermost boundary (e.g., a lowermost surface) of thereof is formed to be located vertically below an uppermost boundary (e.g., an uppermost surface) of the first routing structure 140 most proximate thereto. In additional embodiments, for an individual second contact structures 178, the lowermost boundary of thereof is formed to be located substantially vertically at the uppermost boundary of the first routing structure 140 most proximate thereto.

Still referring to FIG. 1E, the third contact structures 180 may be formed to vertically extend through stack structure 167 and to or into the source structure(s) 158 within the source tier 104. In some embodiments, at least some of the third contact structures 180 vertically extend through and are horizontally surrounded by the tiers 172 of the conductive structures 168 and the additional insulative structures 170 of the stack structure 167. In additional embodiments, at least some of the third contact structures 180 vertically extend through and are horizontally surrounded by the tiers 116 of the sacrificial structures 112 and the insulative structures 114 of the stack structure 167. Uppermost boundaries (e.g., uppermost surfaces) of the third contact structures 180 may be located at or above uppermost boundaries of the stack structure 167, and lowermost boundaries (e.g., lowermost surfaces) of the third contact structures 180 may be locate at or below uppermost boundaries (e.g., uppermost surfaces) of the source structure(s) 158 within the source tier 104. As shown in FIG. 1E, in some embodiments, one or more of the third contact structures 180 vertically extend through fifth isolation material 176 (e.g., insulative material) formed above the stack structure 167, through the stack structure 167, and to the source structure(s) 158.

The third contact structures 180 may each individually be formed of and include conductive material, such as one or more of at least one metal, at least one alloy, and at least one conductive metal-containing material (e.g., a conductive metal nitride, a conductive metal silicide, a conductive metal carbide, a conductive metal oxide). In some embodiments, the third contact structures 180 are each individually formed of and include W. Each of the third contact structures 180 may be substantially homogeneous, or one or more of the third contact structures 180 may individually be heterogeneous.

In some embodiments, the third contact structures 180 are formed substantially concurrent (e.g., substantially simultaneously) with formation of the second contact structures 178 and the conductive structures 168 of the stack structure 167. Put another way, the replacement gate process used to form the conductive structures 168 and the second contact structures 178 may also be used to form the third contact structures 180. In additional embodiments, the third contact structures 180 are not formed at substantially the same time as one or more of the conductive structures 168 and the second contact structures 178. For example, the third contact structures 180 may be formed after the formation of one or more of the conductive structures 168 and the second contact structures 178; or the third contact structures 180 may be formed before the formation of one or more of the conductive structures 168 and the second contact structures 178.

As shown in FIG. 1E, insulative liner structures 182 may be formed to substantially continuously extend over and substantially cover side surfaces (e.g., sidewalls) of at least third contact structures 180 formed to vertically extend through and be horizontally surrounded by the tiers 172 of the conductive structures 168 and the additional insulative structures 170. The insulative liner structures 182 may be horizontally interposed between the third contact structures 180 and the conductive structures 168 and the additional insulative structures 170 of the tiers 172 of the stack structure 167. The insulative liner structures 182 may be formed of and include at least one insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and a $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, each of the insulative liner structures 182 is formed of and includes at least one dielectric oxide material (e.g., $SiO_x$, such as $SiO_2$). In additional embodiments, such as embodiments wherein the third contact structures 180 are formed to vertically extend through and be horizontally surrounded by the tiers 116 of the sacrificial structures 112 and the insulative structures 114, the insulative liner structures 182 may be omitted (e.g., may not be formed to substantially continuously extend over and substantially cover side surfaces of the third contact structures 180).

The conductive line structures 184 may be formed to vertically overlie the stack structure 167. Some of the conductive line structures 184 may be employed as digit line structures (e.g., data line structures, bit line structures), and may be formed over and in electrical communication with the cell pillar structures 120 (and, hence, the vertically extending strings of memory cells 174). Other of the conductive line structures 184 may be employed as routing structures, and may be formed over and in electrical communication with the second contact structures 178. At least the conductive line structures 184 formed over and in electrical communication with the cell pillar structures 120 may exhibit horizontally elongate shapes extending in parallel in the Y-direction. As used herein, the term "parallel" means substantially parallel.

The conductive line structures 184 may be formed of and include conductive material. By way of non-limiting example, the conductive line structures 184 may each individually be formed of and include a metallic material comprising one or more of at least one metal, at least one alloy, and at least one conductive metal-containing material (e.g., a conductive metal nitride, a conductive metal silicide, a conductive metal carbide, a conductive metal oxide). In some embodiments, the conductive line structures 184 are each individually formed of and include W. Each of the conductive line structures 184 may individually be substantially homogeneous, or one or more of the conductive line structures 184 may individually be substantially heterogeneous.

The insulative line structures 186 may be formed on or over the conductive line structures 184. The insulative line structures 186 may serve as insulative cap structures (e.g., dielectric cap structures) for the conductive line structures 184. The insulative line structures 186 may have horizontally elongate shapes extending in parallel in the first horizontal direction (e.g., the Y-direction). Horizontal dimensions, horizontal pathing, and horizontal spacing of the insulative line structures 186 may be substantially the same as the horizontal dimensions, horizontal pathing, and horizontal spacing of the conductive line structures 184.

The insulative line structures 186 may be formed of and include insulative material. By way of non-limiting example, the insulative line structures 186 may each individually be formed of and include a dielectric nitride material, such as $SiN_y$ (e.g., $Si_3N_4$). The insulative line structures 186 may each be substantially homogeneous, or one or more of the insulative line structures 186 may be heterogeneous.

The fourth contact structures 188 may be formed to vertically extend through the insulative line structures 186, and may contact the conductive line structures 184. For each fourth contact structure 188, a first portion thereof may vertically overlie one of the insulative line structures 186, and a second portion thereof may vertically extend through the insulative line structure 186 and contact (e.g., physically contact, electrically contact) one of the conductive line structures 184. Individual fourth contact structures 188 may be at least partially (e.g., substantially) horizontally aligned in the X-direction with individual insulative line structures 186 (and, hence, individual conductive line structures 184). For example, horizontal centerlines of the fourth contact structures 188 in the X-direction may be substantially aligned with horizontal centerlines of the insulative line structures 186 in the X-direction. In addition, the fourth contact structures 188 may be formed at desired locations in the Y-direction along the insulative line structures 186 (and, hence, the conductive line structures 184). In some embodiments, at least some of the fourth contact structures 188 are provided at different positions in the Y-direction than one another. For example, a first of the fourth contact structures 188 may be provided at different position along a length in the Y-direction of a first of the insulative line structures 186 as compared to a position of a second of the fourth contact structures 188 along a length in the Y-direction of a second of the insulative line structures 186. Put another way, at least some (e.g., all) of the fourth contact structures 188 may be horizontally offset from one another in the Y-direction. In additional embodiments, two or more of the fourth contact structures 188 are horizontally aligned with one another in the Y-direction.

The fourth contact structures 188 may each individually be formed of and include conductive material. By way of non-limiting example, the fourth contact structures 188 may be formed of and include one or more of at least one metal, at least one alloy, and at least one conductive metal-containing material (e.g., a conductive metal nitride, a conductive metal silicide, a conductive metal carbide, a conductive metal oxide). In some embodiments, the fourth contact structures 188 are formed of and include Cu. In additional embodiments, the fourth contact structures 188 are formed of and include W.

The formation of the fourth contact structures 188 may form a memory array region 191 of a microelectronic device (e.g., memory device, such as a 3D NAND Flash memory device) to subsequently be formed using the second microelectronic device structure assembly 164. The memory array region 191 may include the source tier 104 including the source structure(s) 158; the stack structure 167; the cell pillar structures 120; the second contact structures 178; the third contact structures 180; the conductive line structures 184; the insulative line structures 186; and the fourth contact structures 188.

Still referring to FIG. 1E, the first conductive pad structures 190 may be formed on or over the fourth contact structures 188. The first conductive pad structures 190 may be formed within and may substantially fill apertures within insulative material (e.g., additional isolation material) formed to cover and surround the conductive line structures 184, the insulative line structures 186, and the fourth contact structures 188. The first conductive pad structures 190 may be formed to horizontally extend over multiple insulative line structures 186 (and, hence, over multiple conductive line structures 184). Individual first conductive pad structures 190 may be coupled to individual fourth contact structures 188. The first conductive pad structures 190 may be employed to couple the fourth contact structures 188 to additional features of a microelectronic device to be formed using the second microelectronic device structure assembly 164, as described in further detail below.

The first conductive pad structures 190 may each individually be formed of and include conductive material. By way of non-limiting example, the first conductive pad structures 190 may be formed of and include one or more of at least one metal, at least one alloy, and at least one conductive metal-containing material (e.g., a conductive metal nitride, a conductive metal silicide, a conductive metal carbide, a conductive metal oxide). A material composition of the first conductive pad structures 190 may be substantially the same as a material composition of the fourth contact structures 188, or the material composition of the first conductive pad structures 190 may be different than the material composition of the fourth contact structures 188. In some embodiments, the first conductive pad structures 190 are formed of and include Cu.

Figure 1F:
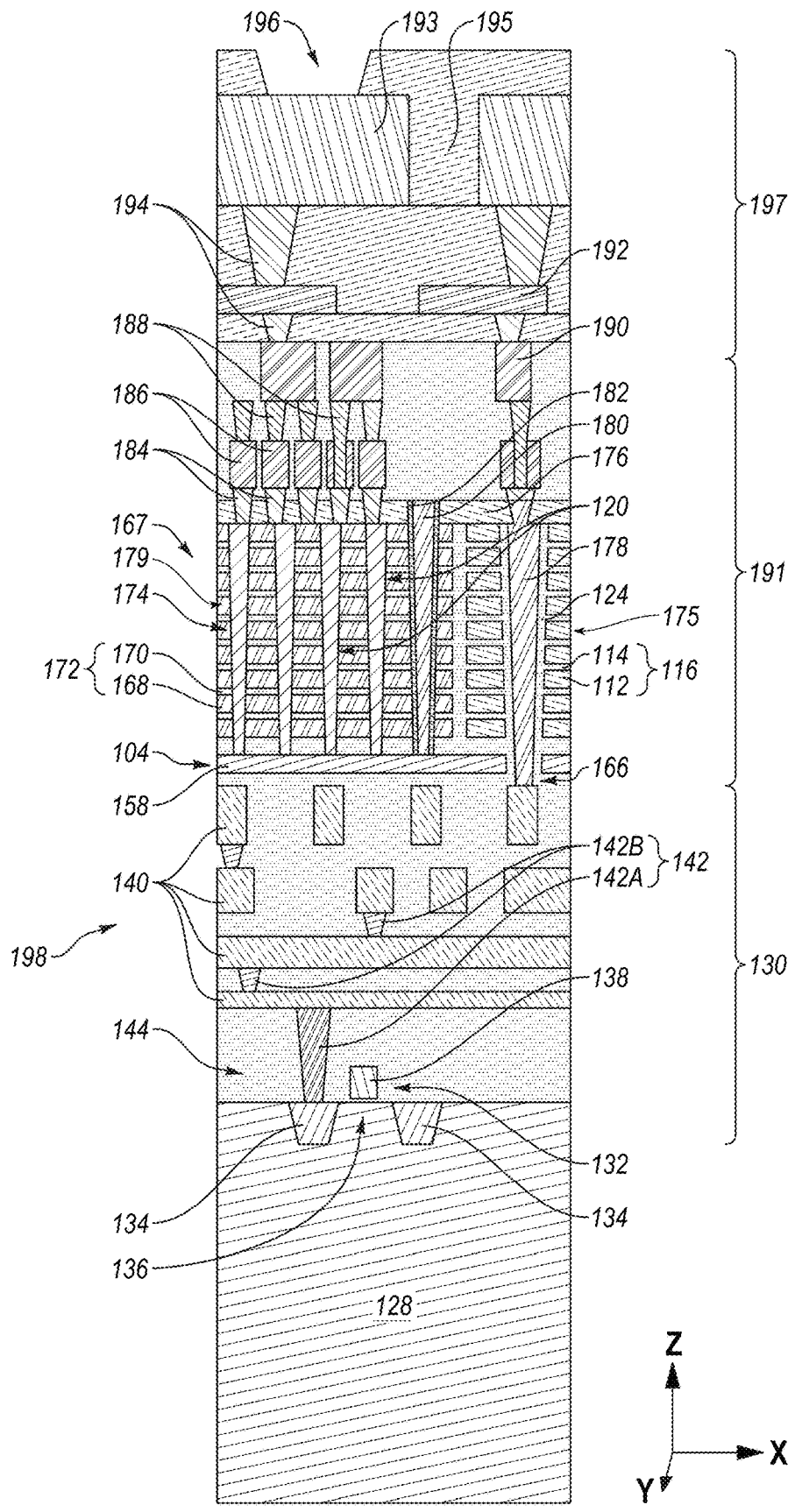

Referring next to FIG. 1F, so-called "back end of line" (BEOL) structures may be formed over the first conductive pad structures 190 to form an interconnect region 197. The BEOL structures may include second routing structures 192, second conductive pad structures 193, and fifth contact structures 194. The second routing structures 192 may vertically overlie the first conductive pad structures 190. The second conductive pad structures 193 may vertically overlie the second routing structures 192. Some of the fifth contact structures 194 may vertically extend between and couple the second routing structures 192 and the first conductive pad structures 190. Some other of the fifth contact structures 194 may vertically extend between and couple the second routing structures 192 and the second conductive pad structures 193. In additional embodiments, one or more of the second conductive pad structures 193 are formed to directly physically contact one or more of the second routing structures 192.

The second routing structures 192, the second conductive pad structures 193, and the fifth contact structures 194 may each be formed of and include conductive material. By way of non-limiting example, the second routing structures 192, the second conductive pad structures 193, and the fifth contact structures 194 may each individually be formed of and include one or more of at least one metal, at least one alloy, and at least one conductive metal-containing material (e.g., a conductive metal nitride, a conductive metal silicide, a conductive metal carbide, a conductive metal oxide). In some embodiments, the second routing structures 192 are formed of and include Cu, the second conductive pad structures 193 are formed of and include Al, and the fifth contact structures 194 are formed of and include W.

Still referring to FIG. 1F, sixth isolation material 195 may be formed cover and surround second routing structures 192, the second conductive pad structures 193, and the fifth contact structures 194. In some embodiments, the sixth isolation material 195 is formed of and includes at least one dielectric oxide material, such as $SiO_x$ (e.g., $SiO_2$). In additional embodiments, the sixth isolation material 195 is formed of and includes at least one low-k dielectric material, such as one or more of $SiO_xC_y$, $SiO_xN_y$, $SiC_xO_yH_z$, and $SiO_xC_zN_y$. The sixth isolation material 195 may be substantially homogeneous, or the sixth isolation material 195 may be heterogeneous. In addition, one or more openings 196 may be formed within the sixth isolation material 195 to expose one or more of the second conductive pad structures 193. The openings 196 may, for example, facilitate access to the second conductive pad structures 193 by one or more additional structures (e.g., wires, such as bond wires) of a relatively larger device.

As shown in FIG. 1F, the formation of the interconnect region 197 may effectuate the formation of a microelectronic device 198 (e.g., a memory device, such as a 3D NAND Flash memory device). The microelectronic device 198 may include the control logic region 130, the memory array region 191 vertically overlying the control logic region 130, and the interconnect region 197 vertically overlying the control logic region 130. In some embodiments, the second conductive pad structures 193, the second routing structures 192, and the first conductive pad structures 190 serve as global routing structures for the microelectronic device 198. The second conductive pad structures 193 may, for example, be configured to receive global signals from an external bus, and to relay the global signals to other components (e.g., structures, devices) of the microelectronic device 198 by way of the second routing structures 192 and the first conductive pad structures 190.

The processing acts described above with reference to FIGS. 1A through 1F resolve limitations on conventional control logic device configurations and associated conventional microelectronic device performance (e.g., speed, data transfer rates, power consumption) that may otherwise result from thermal budget constraints imposed by conventional formation and/or conventional processing of arrays (e.g., memory cell arrays, memory element arrays, access device arrays) for a conventional microelectronic device. For example, by forming the microelectronic device 198 through the methods of the disclosure, configurations of the control logic devices 144 within the control logic region 130 are not limited by the processing conditions (e.g., temperatures, pressures, materials) required to form features (e.g., memory cells, memory elements, access devices) of the memory array region 191.

Thus, in accordance with embodiments of the disclosure, a method of forming a microelectronic device comprises forming a first microelectronic device structure comprising a preliminary stack structure comprising sacrificial structures and insulative structures vertically alternating with the sacrificial structures. A second microelectronic device structure comprising control logic circuitry is formed. The first microelectronic device structure is attached to the second microelectronic device structure to form an assembly. After forming the assembly, the sacrificial structures are at least partially replaced with conductive structures to form a stack structure comprising the conductive structures and remaining portions of the insulative structures. Contact structures are formed to extend through the stack structure. One or more of the contact structures are coupled to the control logic circuitry. Conductive line structures are formed over the stack structure. One or more of the conductive line structures are coupled to the one or more of the contact structures.

In additional embodiments, a microelectronic device of the disclosure is formed to have a different configuration than the microelectronic device 198 at the processing stage depicted in FIG. 1F. By way of non-limiting example, FIGS. 2A through 2F are simplified, partial cross-sectional views illustrating a method of forming a microelectronic device, in accordance with additional embodiments of the disclosure. The method of forming a microelectronic device incorporates some of the processing acts and some of the features previously described, with reference to FIGS. 1A through 1F, in relation to the formation of the microelectronic device 198. The processing stages depicted in FIGS. 2A through 2F and described in further detail below may, for example, include various processing acts performed in place of and/or in combination with the processing acts previously described with reference to FIGS. 1A through IF to form the microelectronic device 198 previously described with reference to FIG. 1F. Throughout FIGS. 2A through 2F and the associated description below, features (e.g., structures, materials, regions, devices) functionally similar to features previously described with reference to one or more of FIGS. 1A through 1F are referred to with similar reference numerals incremented by 100. To avoid repetition, not all features shown in FIGS. 2A through 2F are described in detail herein. Rather, unless described otherwise below, in FIGS. 2A through 2F, a feature designated by a reference numeral that is a 100 increment of the reference numeral of a feature previously described with reference to one or more of FIGS. 1A through 1F will be understood to be substantially similar to the previously described feature.

Figure 2A:
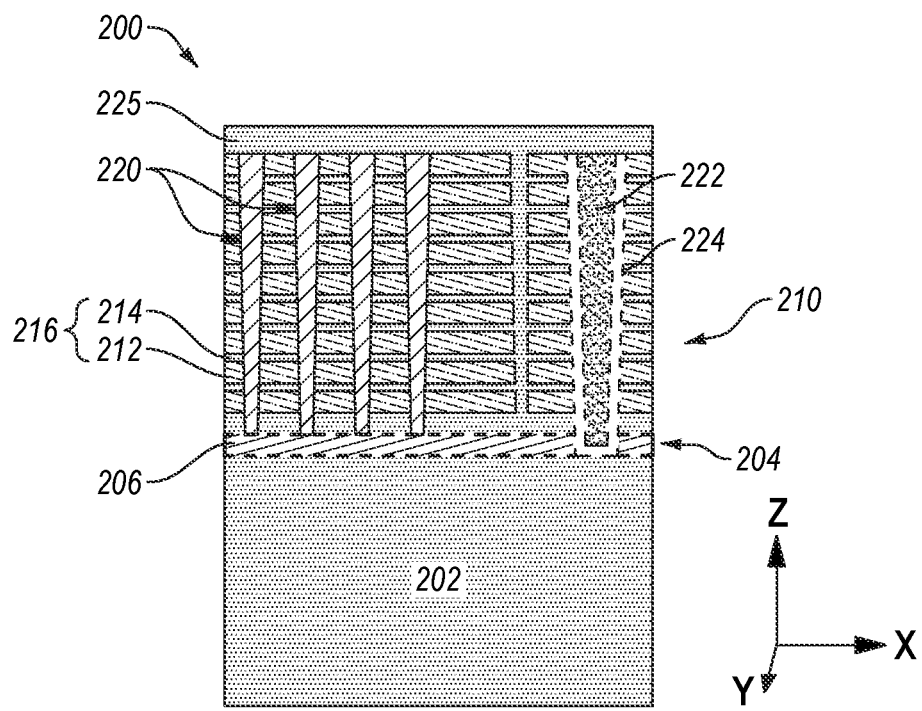
FIGS. 2A through 2F are simplified, partial cross-sectional views illustrating different processing stages of a method of forming a microelectronic device, in accordance with additional embodiments of the disclosure.

Referring to FIG. 2A, a first microelectronic device structure 200 may be formed. The first microelectronic device structure 200 may include features (e.g., structures, materials, regions, devices) substantially similar to and formed in substantially the same manner as the features (e.g., structures, materials, regions, devices) of the first microelectronic device structure 100 at the processing stage previously described with reference to FIG. 1A. For example, the first microelectronic device structure 200 may be formed to include a first base structure 202, a source tier 204 over and/or within the first base structure 202; a preliminary stack structure 210 overlying the source tier 204 and including tiers 216 of sacrificial structures 212 and insulative structure 214; cell pillar structures 220 vertically extending (e.g., in the Z-direction) through the preliminary stack structure 210; and a first isolation material 225 overlying the preliminary stack structure 210. Optionally, the source tier 204 may include source material 206 formed therein at the processing stage of FIG. 1A. In further embodiments, formation of the source material 206 is delayed (e.g., postponed) until a later processing stage, as described in further detail with reference to FIG. 2C. In addition, the first microelectronic device structure 200 may, optionally, be formed to include sacrificial contact structures 222 and insulative liner material 224 vertically extending through the preliminary stack structure 110. In some embodiments, the sacrificial contact structures 222 and the insulative liner material 224 are formed at the processing stage of FIG. 2A. In additional embodiments, the sacrificial contact structures 222 and the insulative liner material 224 are not formed at the processing stage of FIG. 2A. For example, formation of the sacrificial contact structures 222 and the insulative liner material 224 may be delayed (e.g., postponed) until a later processing stage, as described in further detail with reference to FIG. 2C. As another example, formation of at least the sacrificial contact structures 222 (and, optionally, the insulative liner material 224) may be omitted from the method of forming a microelectronic device described herein with reference to FIGS. 2A through 2F, as described in further detail with reference to FIG. 2E.

Figure 2B:
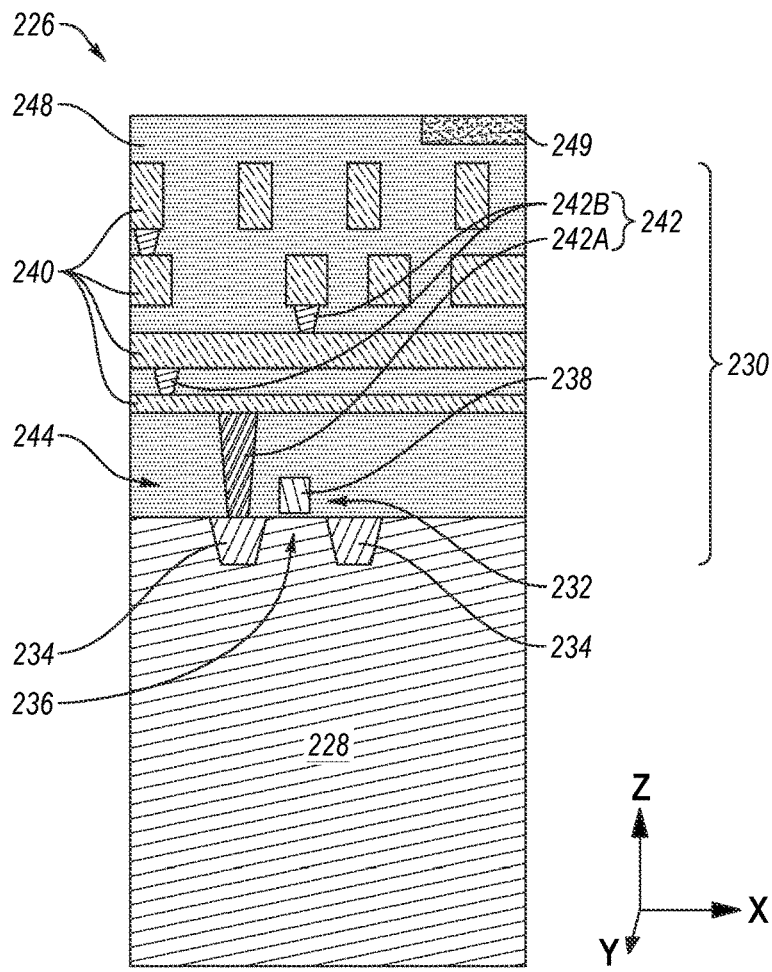

Referring next to FIG. 2B, a second microelectronic device structure 226 may be formed. The second microelectronic device structure 226 may include features (e.g., structures, materials, regions, device) substantially similar to and formed in substantially the same manner as the features (e.g., structures, materials, regions, devices) of the second microelectronic device structure 126 at the processing stage previously described with reference to FIG. 1B, except that the second microelectronic device structure 226 may also be formed to include one or more sacrificial pad structures 249 over vertically uppermost first routing structures 240 thereof. As shown in FIG. 2B, the second microelectronic device structure 226 may include a second base structure 228, and a control logic region 230 including transistors 232 (individually including conductively doped regions 234, a channel region 236, and a gate structure 238), first routing structures 240, first contact structures 242, and a second isolation material 248. The transistors 232, the first routing structures 240, and the first contact structures 242 of the second microelectronic device structure 226 may form control logic circuitry of various control logic devices 244 of the control logic region 230.

The sacrificial pad structures 249 may be formed to have desirable geometric configurations (e.g., shapes, dimensions) and horizontal positions (e.g., in the X-direction and in the Y-direction). The geometric configurations and horizontal positions of the sacrificial pad structures 249 at least partially depends on the geometric configurations and horizontal positions of contact openings to be subsequently be formed (e.g., using the sacrificial contact structures 222 (FIG. 2A), whether formed at or after the processing stage of FIG. 2A; or without the use of the sacrificial contact structures 222 (FIG. 2A)) within an assembly subsequently formed using the first microelectronic device structure 200 and the second microelectronic device structure 226. An individual sacrificial pad structure 249 of the second microelectronic device structure 226 may be formed to have a geometric configuration and a horizontal position permitting a subsequently formed contact opening to be positioned within a horizontal area (e.g., in the XY-plane) of the sacrificial pad structure 249. As a non-limiting example, the individual sacrificial pad structure 249 may be formed to have a geometric configuration and a horizontal position permitting an individual sacrificial contact structure 222 (FIG. 2A) to be positioned within a horizontal area of the sacrificial pad structure 249 following attachment of an assembly formed using the first microelectronic device structure 200 (FIG. 2A) to the second microelectronic device structure 226, as described in further detail below with reference to FIG. 2D. In some embodiments, one or more first contact structures 242 vertically extend from one or more of the sacrificial pad structure 249 to one or more of the first routing structures 240.

The sacrificial pad structures 249 may be formed of and include at least one material (e.g., at least one dielectric material) that may be selectively removed relative to other materials of the second microelectronic device structure 226, such as the second isolation material 248; and that may be selectively removed relative to additional materials of an assembly formed, in part, from the first microelectronic device structure 200 and the second microelectronic device structure 226, as described in further detail below. A material composition of the sacrificial pad structures 249 may be substantially the same as a material composition of the sacrificial contact structures 222 (FIG. 2A) (whether formed at or after the processing stage of FIG. 2A), or the material composition of the sacrificial pad structures 249 may be different than the material composition of the sacrificial contact structures 222 (FIG. 2A). As a non-limiting example, the sacrificial pad structures 249 may be formed of and include at least one insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, the sacrificial pad structures 249 are formed of and include one or more of at least one dielectric nitride material (e.g., $SiN_y$, such as $Si_3N_4$), and at least one dielectric oxynitride material (e.g., $SiO_xN_y$). The sacrificial pad structures 249 may individually be formed to be substantially homogeneous, or the sacrificial pad structures 249 may individually be formed to be heterogeneous.

Still referring to FIG. 2B, second isolation material 248 may be formed to cover and surround portions of the transistors 232, the first routing structures 240, the first contact structures 242, and the sacrificial pad structures 249. In some embodiments, the second isolation material 248 is formed such that an uppermost surface thereof is substantially coplanar with uppermost surfaces of the sacrificial pad structures 249. Accordingly, the uppermost surfaces of the sacrificial pad structures 249 are not covered by the second isolation material 248. In additional embodiments, the second isolation material 248 is formed to substantially cover the uppermost surfaces of the sacrificial pad structures 249, such that the uppermost surface of the second isolation material 248 vertically overlies the uppermost surfaces of the sacrificial pad structures 249.

Figure 2C:
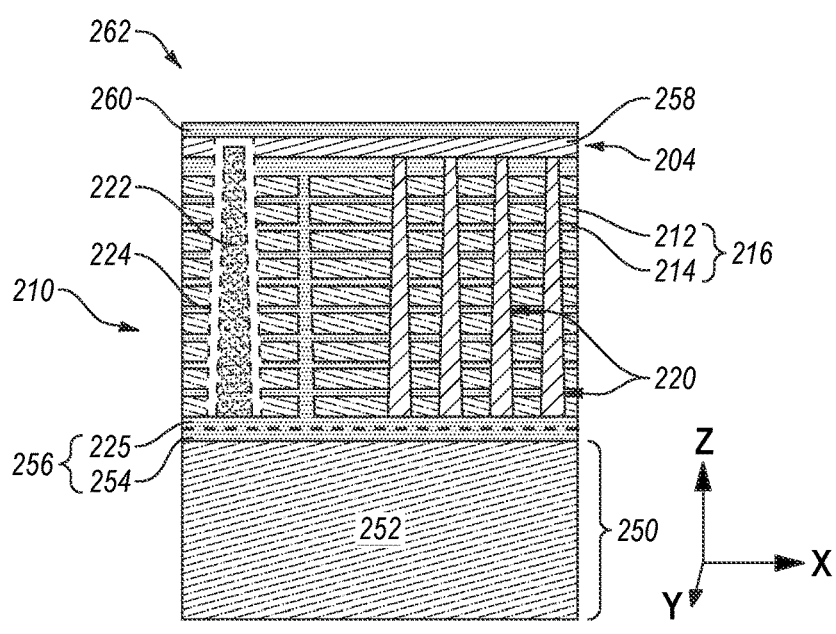

Referring next to FIG. 2C, the first microelectronic device structure 200 (FIG. 2A) may be attached (e.g., bonded) to a third microelectronic device structure 250 to form a first microelectronic device structure assembly 262. The first microelectronic device structure assembly 262 may include features (e.g., structures, materials, regions, devices) substantially similar to and formed in substantially the same manner as the features (e.g., structures, materials, regions, devices) of first microelectronic device structure assembly 162 at the processing stage previously described with reference to FIG. 1C. For example, the third microelectronic device structure 250 (include a third base structure 252, and a third isolation material 254 on, over, or within the third base structure 252) may be attached to the first microelectronic device structure 200 (FIG. 2A) (e.g., by way of oxide-oxide bonding that effectuated the formation of a first connected isolation structure 256) to first microelectronic device structure assembly 162; the first microelectronic device structure assembly 262 may be inverted (e.g., flipped upside down in the Z-direction); at least a portion of the first base structure 202 (FIG. 2A) may be removed; one or more source structure(s) 258 may be formed within the source tier 204; and a fourth isolation material 260 may be formed on or over the source structure(s) 258.

Optionally, if the insulative liner material 224 and the sacrificial contact structures 222 were not formed at the processing stage previously described with reference to FIG. 2A, the insulative liner material 224 and the sacrificial contact structures 222 may be formed at the processing stage of FIG. 2C. For example, following the removal of the first base structure 202 (FIG. 2A), contact openings may be formed to vertically extend through the source material 206 (FIG. 2A) (and/or source material formed after the removal of the first base structure 202 (FIG. 2A)) and the preliminary stack structure 210, and to or into the first connected isolation structure 256. Thereafter, the insulative liner material 224 and the sacrificial contact structures 222 may be formed within the contact openings. In such embodiments, tapering of the insulative liner material 224 and the sacrificial contact structures 222 may be reversed relative to how the tapering is depicted in FIG. 2C. For example, a horizontal area of an individual sacrificial contact structure 222 may decrease in a direction (e.g., in the negative Z-direction) heading towards the first connected isolation structure 256, rather than increasing in the manner depicted in FIG. 2C.

Figure 2D:
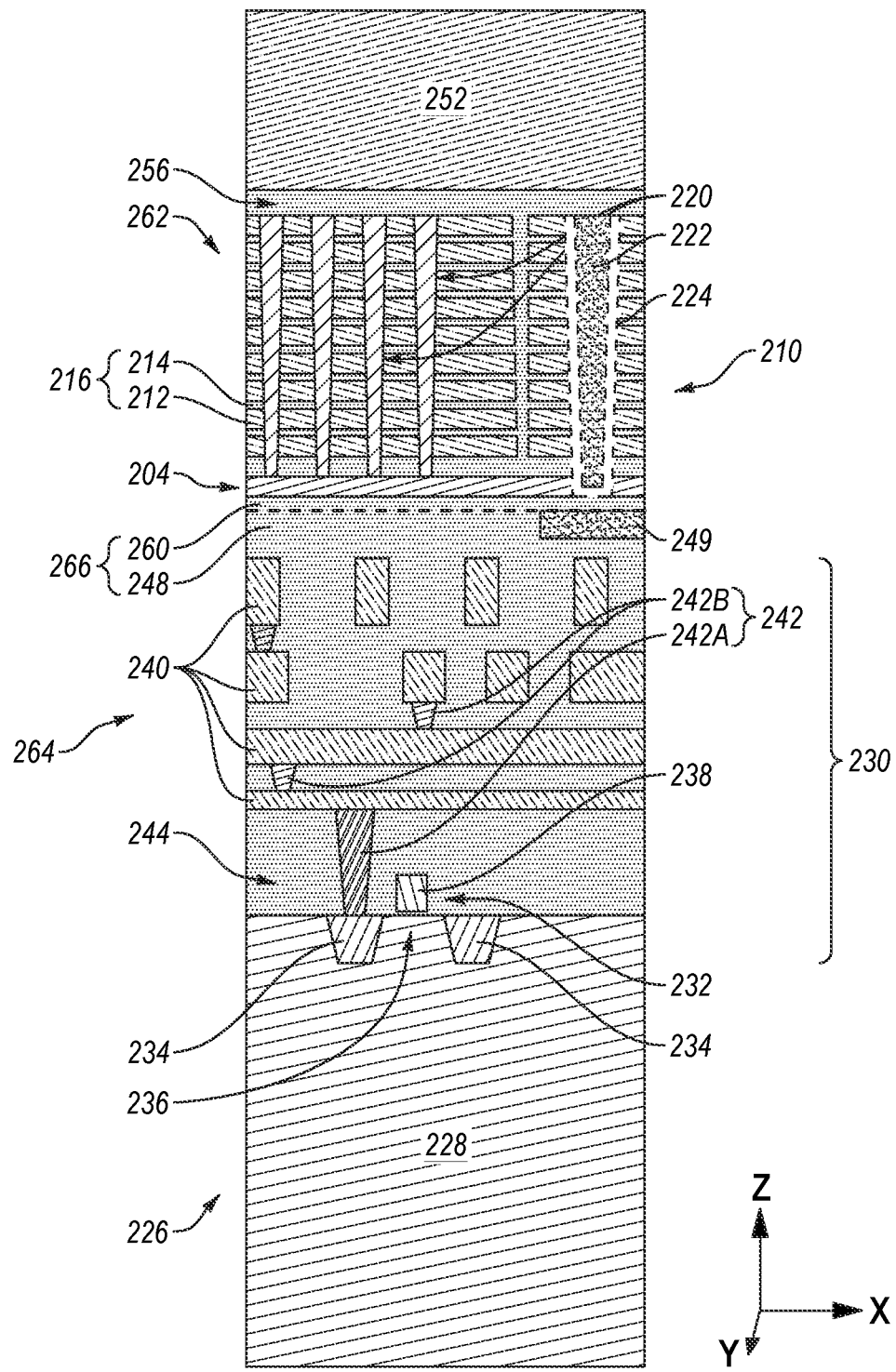

Referring next to FIG. 2D, following the formation of the fourth isolation material 260, the first microelectronic device structure assembly 262 may be vertically inverted (e.g., flipped upside down in the Z-direction) and attached (e.g., bonded) to the second microelectronic device structure 226 to form a second microelectronic device structure assembly 264. The second microelectronic device structure assembly 264 may include features (e.g., structures, materials, regions, devices) substantially similar to and formed in substantially the same manner as the features (e.g., structures, materials, regions, devices) of the second microelectronic device structure assembly 164 at the processing stage previously described with reference to FIG. 1D. In addition, the second microelectronic device structure assembly 264 also includes the sacrificial pad structures 249.

If the sacrificial contact structures 222 (and the insulative liner material 224) are formed prior to the processing stage of FIG. 2D (e.g., at the processing stage previously described with reference to FIG. 2A, at the processing stage previously described with reference to FIG. 2C), the formation of the second microelectronic device structure assembly 264 may result in the sacrificial contact structures 222 being positioned within horizontal areas of the sacrificial pad structures 249. An individual sacrificial contact structure 222 may vertically overlie (e.g., in the Z-direction) and be positioned with a horizontal area (e.g., in the XY-plane) of an individual sacrificial pad structure 249.

As shown in FIG. 2D, in some embodiments, the fourth isolation material 260 (which serves as a portion of the second connected isolation structure 266 following formation of the second microelectronic device structure assembly 264) directly physically contacts the sacrificial pad structures 249. In additional embodiments, such as embodiments where the second isolation material 248 (which serves as an additional portion of the second connected isolation structure 266 following formation of the second microelectronic device structure assembly 264) is formed to substantially cover the uppermost surfaces of the sacrificial pad structures 249, the fourth isolation material 260 does not directly physically contact the sacrificial pad structures 249. For example, the second isolation material 248 may be interposed between the sacrificial pad structures 249 and the fourth isolation material 260.

Figure 2E:
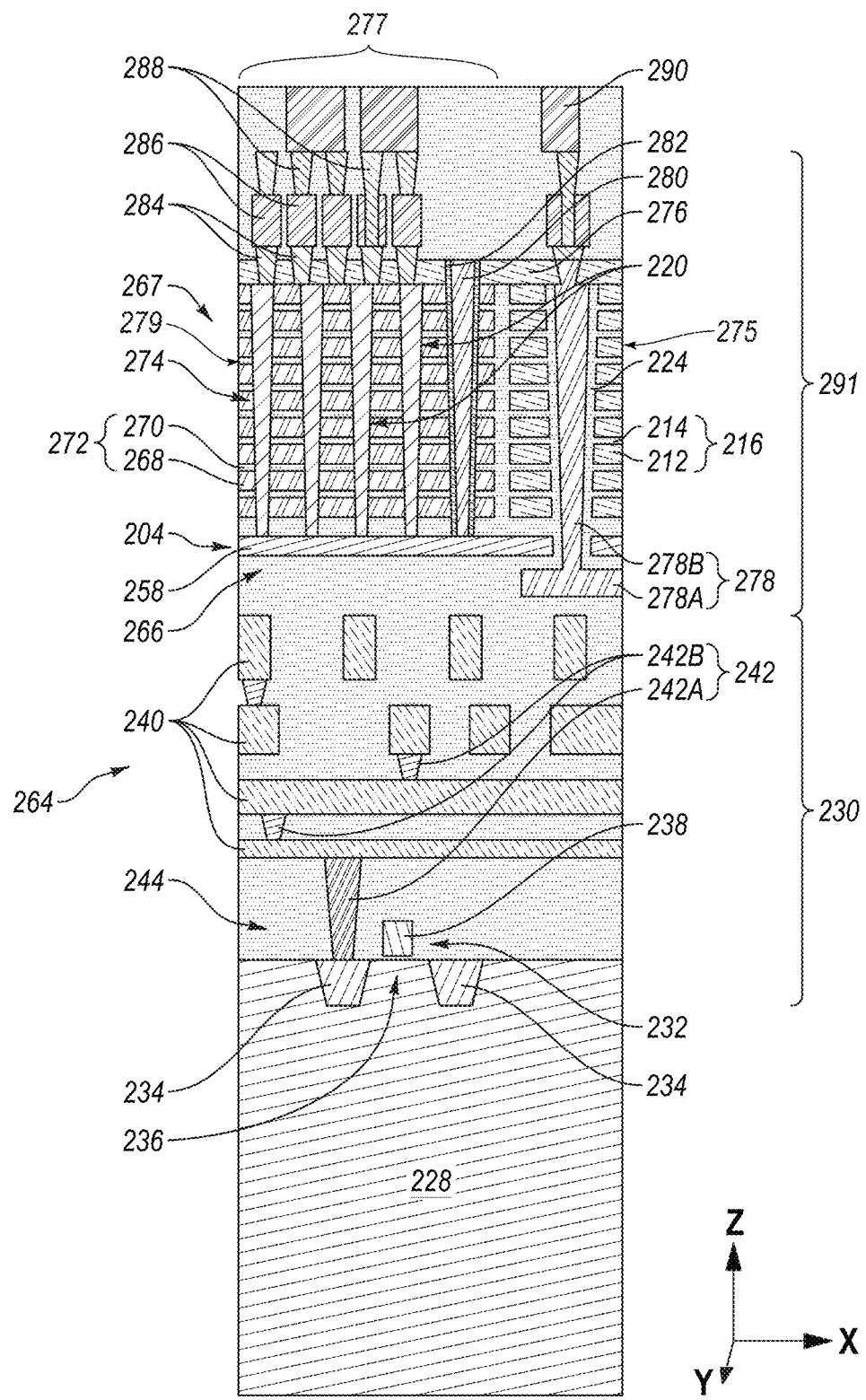

Referring next to FIG. 2E, the third base structure 252 (FIG. 2D) and at least a portion of the first connected isolation structure 256 (FIG. 2D) may be removed. The stack structure 267 may be formed from the preliminary stack structure 210 (FIG. 2D). The second microelectronic device structure assembly 264 may be subjected to so called "replacement gate" or "gate last" processing acts to at least partially replace the sacrificial structures 212 (FIG. 2D) of the preliminary stack structure 210 (FIG. 2D) with conductive structures 268 and form the stack structure 267. The stack structure 267 may be formed to include the conductive structures 268, and additional insulative structures 270 vertically alternating (e.g., in the Z-direction) with the conductive structures 268. The conductive structures 268 and the additional insulative structures 270 may be arranged in tiers 272, wherein each of the tiers 272 individually includes at least one of the conductive structures 268 vertically neighboring at least one of the additional insulative structures 270. One or more section(s) 275 (e.g., horizontal section(s)) of the preliminary stack structure 210 (FIG. 2D) may not be subjected to replacement gate processing acts. Such section(s) 275 may, for example, be positioned outside of a horizontal area 277 (e.g., in the XY-plane) of an array of the cell pillar structures 220. Within section(s) 275 of the preliminary stack structure 210 (FIG. 2D) not subjected to replacement gate processing acts, the tiers 216 of the sacrificial structures 212 and the insulative structures 214 may be maintained. As a result, the stack structure 267 formed from the preliminary stack structure 210 (FIG. 2D) may include one or more first section(s) 279 including the tiers 272 of the conductive structures 268 and the additional insulative structures 270, and one or more second section(s) 275 horizontally offset from the first section(s) 279 and including the tiers 216 of the sacrificial structures 212 and the insulative structures 214. In some such embodiments, the cell pillar structures 220 are positioned within first section(s) 279 of the stack structure 267 including the tiers 272 of the conductive structures 268 and the additional insulative structures 270. The second contact structures 278 may be formed using the sacrificial pad structures 249 (FIG. 2D) (and the sacrificial contact structures 222 (FIG. 2D), if previously formed); and each of third contact structures 280, conductive line structures 284, insulative line structures 286, fourth contact structures 288, and first conductive pad structures 290 may be formed. As shown in FIG. 2E, the second contact structures 278 may be formed to exhibit different configurations than the second contact structures 178 (FIGS. 1E and 1F) formed for the microelectronic device 198 (FIG. 1F). For example, as described in further detail below, an individual second contact structure 278 may be formed to include a first region 278A (e.g., a lower region) formed using an individual sacrificial pad structure 249 (FIG. 2D), and a second region 278B (e.g., an upper region) overlying the first region 278A and substantially confined within a horizontal area of the first region 278A. The first region 278A may underlie the stack structure 267, and the second region 278B may vertically extend through the stack structure 267 and to the first region 278A. The second region 278B may be formed using an individual sacrificial contact structure 222 (FIG. 2D), or may be formed without the use of an individual sacrificial contact structure 222 (FIG. 2D). Aside from the second contact structures 278, features (e.g., structures, materials, regions, devices) of the second microelectronic device structure assembly 264 at the processing stage of FIG. 2E may be substantially similar to and may be formed in substantially the same manner as the features (e.g., structures, materials, regions, devices) of the second microelectronic device structure assembly 164 at the processing stage previously described with reference to FIG. 1E.

For an individual second contact structure 278, the second region 278B thereof may be positioned within boundaries (e.g., vertical boundaries, horizontal boundaries) of an upper portion of a contact opening formed to vertically extend through the stack structure 267 and to an upper boundary of an individual sacrificial pad structure 249 (FIG. 2D); and the first region 278A thereof may be positioned within boundaries (e.g., vertical boundaries, horizontal boundaries) of a lower portion of the contact opening formed by removing (e.g., exhuming) the sacrificial pad structure 249 (FIG. 2D). A geometric configuration (e.g., shape, dimensions) of the first region 278A may be substantially the same as a geometric configuration of the sacrificial pad structure 249 (FIG. 2D); and a geometric configuration of the second region 278B may be substantially the same as a geometric configuration of a preliminary contact opening formed to extend to the sacrificial pad structure 249 (FIG. 2D). As shown in FIG. 2E, for an individual second contact structure 278, the first region 278A may vertically underlie (e.g., in the Z-direction) the second region 278B, and the first region 278A may horizontally extend (e.g., in the X-direction, in the Y-direction) beyond horizontal boundaries of the second region 278B. For each second contact structure 278, the first region 278A thereof may be integral and continuous with the second region 278B thereof. Put another way, each second contact structure 278 may be formed to be a substantially monolithic structure including the first region 278A and the second region 278B.

The second contact structures 278 (including the first regions 278A and the second regions 278B thereof) may be formed of and include conductive material. By way of non-limiting example, the second contact structures 278 may each individually be formed of and include one or more of at least one metal, at least one alloy, and at least one conductive metal-containing material (e.g., a conductive metal nitride, a conductive metal silicide, a conductive metal carbide, a conductive metal oxide). In some embodiments, the second contact structures 278 are each individually formed of and include W. Each of the second contact structures 278 may be substantially homogeneous, or one or more of the second contact structures 278 may individually be heterogeneous.

To form the second contact structures 278, the sacrificial contact structures 222 (FIG. 2D), if previously formed, may be selectively removed (e.g., selectively exhumed) to form initial contact openings (e.g., first contact openings) individually surrounded by the insulative liner material 224. If the sacrificial contact structures 222 (FIG. 2D) were not previously formed, openings may be formed to vertically extend through at least through the stack structure 267 and the source structure(s) 258, and then the insulative liner material 224 may be formed within the openings to form to the initial contact openings. Following the formation of the initial contact openings, at least portions of the insulative liner material 224 and the second connected isolation structure 266 vertically interposed between and within horizontal areas of lower ends (e.g., bottoms) of the initial contact openings may be subjected to a punch-through etch to form extended contact openings (e.g., second contract openings) vertically extending to and exposing portions of some of the sacrificial pad structures 249 (FIG. 2D). The sacrificial pad structures 249 (FIG. 2D) may then be removed (e.g., exhumed) through the extended contact openings to form final contact openings (e.g., third contact openings, further extended contact openings). The second contact structures 278 may then be formed within the final contact openings.

The sacrificial contact structures 222 (FIG. 2D), if previously formed, may be selectively removed to form the initial contact openings by treating the second microelectronic device structure assembly 264 with at least one etchant (e.g., at least one wet etchant) formulated to selectively remove exposed portions of the sacrificial contact structures 222 (FIG. 2D) without substantially removing other exposed features of the second microelectronic device structure assembly 264, such as exposed portions of the insulative liner material 224. By way of non-limiting example, depending on material compositions of the sacrificial contact structures 222 (FIG. 2D) and the insulative liner material 224, the etchant may comprise one or more of TMAH, $H_3PO_4$, $H_2SO_4$, HCl, $HNO_3$, and another material. In some embodiments wherein the sacrificial contact structures 222 (FIG. 2D) comprise one or more of dielectric nitride material (e.g., $SiN_y$, such as $Si_3N_4$) and dielectric oxynitride material (e.g., $SiO_xN_y$), the sacrificial contact structures 222 (FIG. 2D) are selectively removed relative to the insulative liner material 224 using a wet etchant comprising $H_3PO_4$.

If the sacrificial contact structures 222 (FIG. 2D) were not previously formed, the openings formed to vertically extend at least through the stack structure 272 and the source structure(s) 258 may be formed using conventional processes (e.g., conventional masking processes, conventional material removal processes), which are not described in detail herein. Thereafter, the insulative liner material 224 may be formed within the openings, to form the initial contact openings, using additional conventional processes (e.g., conventional material deposition processes, conventional material removal processes), which are also not described in detail herein.

In some embodiments, the punch-through etch employed to vertically extend the initial contact openings and expose portions of the sacrificial pad structures 249 (FIG. 2D) removes portions (e.g., bottom portions) of the insulative liner material 224 exposed within the initial contact openings, as well as portions of the second connected isolation structure 266 underlying the portions of the insulative liner material 224. In additional embodiments, such as embodiments wherein openings preceding the initial contact openings are formed to extend to the sacrificial pad structures 249 (FIG. 2D), the punch-through etch substantially only removes portions (e.g., bottom portions) of the insulative liner material 224 exposed within the initial contact openings to expose portions of the sacrificial pad structures 249 (FIG. 2D).

To remove the sacrificial pad structures 249 (FIG. 2D) following the punch-through etch, the second microelectronic device structure assembly 264 may be treated with at least one additional etchant (e.g., at least one additional wet etchant) formulated to selectively remove exposed portions of the sacrificial pad structures 249 (FIG. 2D) without substantially removing other exposed features of the second microelectronic device structure assembly 264 (e.g., exposed portions of the insulative liner material 224, exposed portions of the second connected isolation structure 266). By way of non-limiting example, depending on material compositions of the sacrificial pad structures 249 (FIG. 2D), the insulative liner material 224, and the second connected isolation structure 266, the etchant may comprise one or more of TMAH, $H_3PO_4$, $H_2SO_4$, HCl, $HNO_3$, and another material. In some embodiments wherein the sacrificial pad structures 249 (FIG. 2D) comprise one or more of dielectric nitride material (e.g., $SiN_y$, such as $Si_3N_4$) and dielectric oxynitride material (e.g., $SiO_xN_y$), the sacrificial pad structures 249 (FIG. 2D) are selectively removed through the extended contact openings using a wet etchant comprising $H_3PO_4$.

Following the removal of the sacrificial pad structures 249 (FIG. 2D), the resulting final contact openings may be filled (e.g., substantially filled) with conductive material to form the second contact structures 278 (including the first regions 278A and the second regions 278B thereof) using conventional processes (e.g., conventional material deposition processes, conventional material removal processes), which are not described in detail herein. In some embodiments, the filling the final contact openings with conductive material to form the second contact structures 278 is effectuated substantially concurrent (e.g., substantially simultaneously) with filling void spaces, resulting from removal of the sacrificial structures 212 (FIG. 2E), with conductive material to form the conductive structures 268 of the stack structure 267. Put another way, the replacement gate process used to form the conductive structures 268 may also be used to form the second contact structures 278. In additional embodiments, the second contact structures 278 are not formed at substantially the same time as the conductive structures 268 of the stack structure 267. For example, the second contact structures 278 may be formed after the formation of the conductive structures 268, or the second contact structures 278 may be formed before the formation of the conductive structures 268.

Figure 2F:
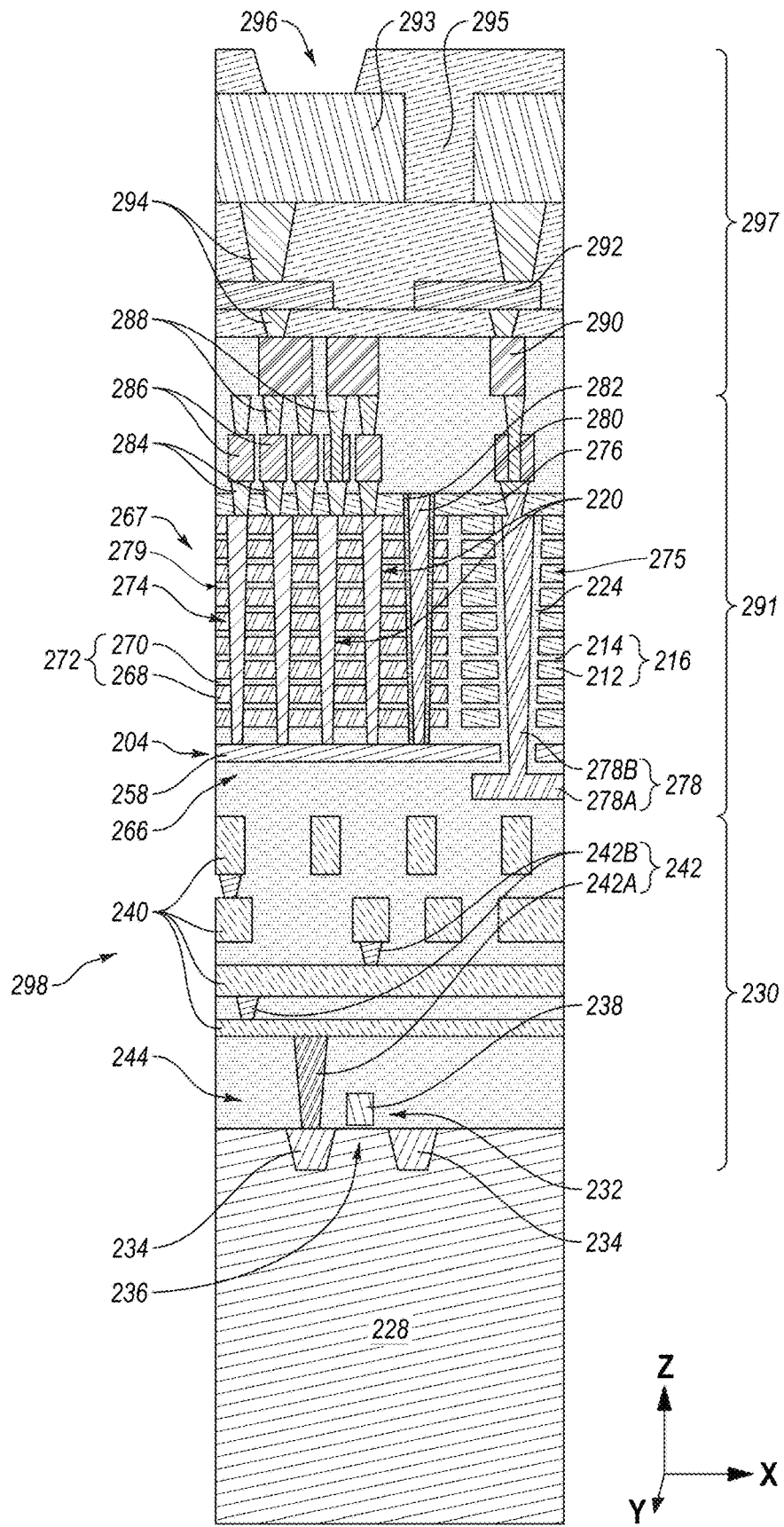

Referring next to FIG. 2F, BEOL structures may be formed over the first conductive pad structures 290 to form an interconnect region 297 and effectuate the formation of a microelectronic device 298 (e.g., a memory device, such as a 3D NAND Flash memory device). Aside from the second contact structures 278 (including the first regions 278A and the second regions 278B thereof), the microelectronic device 298 may include features (e.g., structures, materials, regions, devices) substantially similar to and formed in substantially the same manner as the features (e.g., structures, materials, regions, devices) of the microelectronic device 198 at the processing stage previously described with reference to FIG. 1F. The microelectronic device 298 may, for example, include the control logic region 230, the memory array region 291 vertically overlying the control logic region 230, and the interconnect region 297 vertically overlying the control logic region 230. The BEOL structures of the interconnect region 297 may include second routing structures 292 vertically overlying the first conductive pad structures 290; second conductive pad structures 293 vertically overlying the second routing structures 292; and fifth contact structures 294 coupling the second routing structures 292 to the first conductive pad structures 290 and the second conductive pad structures 293. In addition, the interconnect region 297 may also include a sixth isolation material 295 formed to cover and surround the second routing structures 292, the second conductive pad structures 293, and the fifth contact structures 294; and, optionally, openings 296 formed within the sixth isolation material 295 to expose one or more of the second conductive pad structures 293.

Thus, in accordance with embodiments of the disclosure, a microelectronic device comprises a stack structure, a source structure, conductive line structures, and contact structures. The stack structure overlies control logic circuitry and comprise conductive structures and insulative structures vertically alternating with the conductive structures. The source structure is interposed between the control logic circuitry and the stack structure. The conductive line structures overlie the stack structure. The contact structures extend through the stack structure and the source structure and are coupled to the control logic circuitry and some of the conductive line structures. At least one of the contact structures comprises an upper region extending through the stack structure and the source structure, and a lower region underlying the source structure and having a horizontal cross-sectional area greater than that of the upper region.

Furthermore, in accordance with embodiments of the disclosure, a memory device comprises a memory array region, a control logic region vertically underlying the memory array region, and an interconnect region vertically overlying the memory array region. The memory array region comprises a stack structure comprising tiers each comprising a conductive structure and an insulative structure vertically neighboring the conductive structure; a memory array comprising strings of memory cells vertically extending through the stack structure; a source structure vertically underlying the stack structure and in electrical communication with the strings of memory cells; digit line structures vertically overlying the stack structure and in electrical communication with the strings of memory cells; contact structures horizontally offset from the memory array and vertically extending through the stack structure and the source structure; and an insulative liner material substantially covering sidewalls of the contact structures, the insulative liner material interposed between contact structures and each of the stack structure and the source structure. The control logic region comprises control logic devices in electrical communication with the contact structures and configured to effectuate control operations for the strings of memory cells. The interconnect region comprises conductive routing structures in electrical communication with the digit line structures and the contact structures; and conductive pad structures over and in electrical communication with the conductive routing structures.

Figure 3:
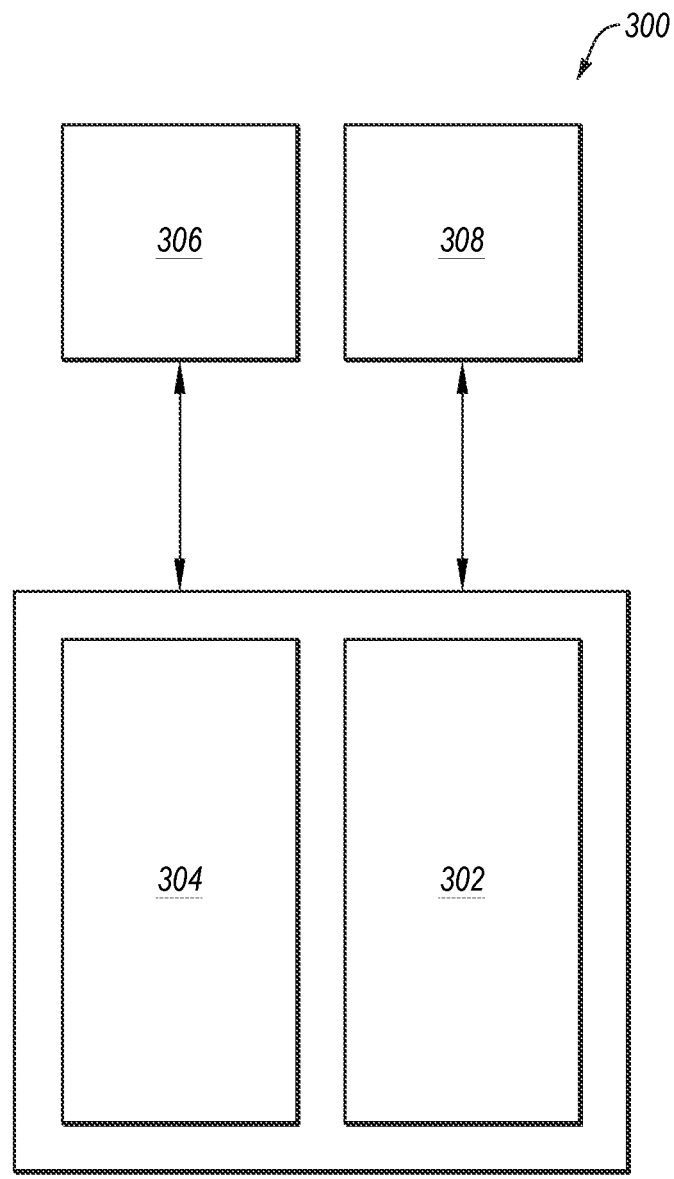
FIG. 3 is a schematic block diagram of an electronic system, in accordance with an embodiment of the disclosure.

Microelectronic devices (e.g., the microelectronic device 198 (FIG. 1F), the microelectronic device 298 (FIG. 2F)) in accordance with embodiments of the disclosure may be used in embodiments of electronic systems of the disclosure. For example, FIG. 3 is a schematic block diagram of an illustrative electronic system 300 according to embodiments of disclosure. The electronic system 300 may comprise, for example, a computer or computer hardware component, a server or other networking hardware component, a cellular telephone, a digital camera, a personal digital assistant (PDA), portable media (e.g., music) player, a Wi-Fi or cellular-enabled tablet such as, for example, an iPad® or SURFACE® tablet, an electronic book, a navigation device, etc. The electronic system 300 includes at least one memory device 302. The memory device 302 may comprise, for example, a microelectronic device (e.g., the microelectronic device 198 (FIG. 1F), the microelectronic device 298 (FIG. 2F)) previously described herein. The electronic system 300 may further include at least one electronic signal processor device 304 (often referred to as a "microprocessor"). The electronic signal processor device 304 may, optionally, comprise a microelectronic device (e.g., the microelectronic device 198 (FIG. 1F), the microelectronic device 298 (FIG. 2F)) previously described herein. While the memory device 302 and the electronic signal processor device 304 are depicted as two (2) separate devices in FIG. 3, in additional embodiments, a single (e.g., only one) memory/processor device having the functionalities of the memory device 302 and the electronic signal processor device 304 is included in the electronic system 300. In such embodiments, the memory/processor device may include a microelectronic device (e.g., the microelectronic device 198 (FIG. 1F), the microelectronic device 298 (FIG. 2F)) previously described herein. The electronic system 300 may further include one or more input devices 306 for inputting information into the electronic system 300 by a user, such as, for example, a mouse or other pointing device, a keyboard, a touchpad, a button, or a control panel. The electronic system 300 may further include one or more output devices 308 for outputting information (e.g., visual or audio output) to a user such as, for example, a monitor, a display, a printer, an audio output jack, and/or a speaker. In some embodiments, the input device 306 and the output device 308 comprise a single touchscreen device that can be used both to input information to the electronic system 300 and to output visual information to a user. The input device 306 and the output device 308 may communicate electrically with one or more of the memory device 302 and the electronic signal processor device 304.

Thus, in accordance with embodiments of the disclosure, an electronic system comprises an input device, an output device, a processor device operably connected to the input device and the output device, and a memory device operably connected to the processor device. The memory device comprises a stack structure, a source structure, digit line structures, conductive contact structures, control logic circuitry, and conductive routing structures. The stack structure comprises conductive structures vertically alternating with insulative structures. The source structure underlies the stack structure. The digit line structures overlie the stack structure. The strings of memory cells extend through the stack structure and are coupled to the source structure and the digit line structures. The conductive contact structures extend through the stack structure and the source structure. The control logic circuitry underlies the source structure and is coupled to the conductive contact structures. The conductive routing structures overlie the digit line structures and are coupled to the conductive contact structures.

The structures, devices, and methods of the disclosure advantageously facilitate one or more of improved microelectronic device performance, reduced costs (e.g., manufacturing costs, material costs), increased miniaturization of components, and greater packaging density as compared to conventional structures, conventional devices, and conventional methods. The structures, devices, and methods of the disclosure may also improve scalability, efficiency, and simplicity as compared to conventional structures, conventional devices, and conventional methods.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A microelectronic device, comprising:
 a stack structure overlying control logic circuitry and including:
  a first section comprising conductive structures and insulative structures vertically alternating with the conductive structures; and
  a second section horizontally neighboring the first section, the second section comprising the insulative structures and further insulative structures vertically alternating with the insulative structures;
 a source structure interposed between the control logic circuitry and the stack structure;
 conductive line structures overlying the stack structure; and
 contact structures extending through the stack structure and the source structure and coupled to the control logic circuitry, at least one of the contact structures extending through the second section of the stack structure and comprising:
   an upper region extending through the stack structure and the source structure; and
   a lower region underlying the source structure and having a horizontal cross-sectional area greater than that of the upper region.

2. The microelectronic device of claim 1, further comprising strings of memory cells extending through the stack structure and coupled to the source structure and some other of the conductive line structures.

3. The microelectronic device of claim 1, wherein the at least one of the contact structures comprises a substantially monolithic structure including the upper region and the lower region.

4. The microelectronic device of claim 1, further comprising additional contact structures extending through the stack structure and coupled to the source structure, at least one of the additional contact structures extending through the first section of the stack structure.

5. The microelectronic device of claim 1, wherein the control logic circuitry comprises complementary metal-oxide-semiconductor (CMOS) circuitry.

6. The microelectronic device of claim 1, further comprising:
   conductive routing structures overlying and coupled to the conductive line structures; and
   conductive pad structures overlying and coupled to the conductive routing structures.

7. A memory device, comprising:
   a memory array region comprising:
      a stack structure comprising:
         a first section comprising conductive structures and insulative structures vertically alternating with the conductive structures; and
         a second section horizontally neighboring the first section, the second section comprising further insulative structures and the insulative structures vertically alternating with the further insulative structures;
      a memory array comprising strings of memory cells vertically extending through the stack structure;
      a source structure vertically underlying the stack structure and in electrical communication with the strings of memory cells;
      digit line structures vertically overlying the stack structure and in electrical communication with the strings of memory cells;
      contact structures horizontally offset from the memory array and vertically extending through the stack structure and the source structure; and
      an insulative liner material substantially covering sidewalls of the contact structures, the insulative liner material interposed between the contact structures and each of the stack structure and the source structure;
   a control logic region vertically underlying the memory array region and comprising control logic devices in electrical communication with the contact structures and configured to effectuate control operations for the strings of memory cells; and
   an interconnect region vertically overlying the memory array region and comprising:
      conductive routing structures in electrical communication with the digit line structures and the contact structures; and
      conductive pad structures over and in electrical communication with the conductive routing structures.

8. The memory device of claim 7, wherein the contact structures physically contact additional conductive routing structures vertically underlying the source structure and in electrical communication with the control logic devices.

9. The memory device of claim 7, wherein the contact structures each comprise:
   a lower region vertically underlying the source structure; and
   an upper region integral with the lower region and vertically extending through the source structure and the stack structure, the upper region having smaller horizontal dimensions than the lower region.

10. The memory device of claim 7, further comprising additional contact structures vertically extending through the stack structure and in electrical communication with the source structure, at least some of the additional contact structures horizontally interposed between the memory array and at least some of the contact structures.

11. The memory device of claim 7, wherein the control logic devices comprise complementary metal-oxide-semiconductor (CMOS) circuitry, at least some of the control logic devices positioned within a horizontal area of the memory array.

12. The memory device of claim 7, wherein the conductive structures of the stack structure comprise tungsten.

13. The memory device of claim 7, wherein:
   the further insulative structures each comprise a dielectric nitride material; and
   the insulative structures comprises a dielectric oxide material.

14. An electronic system, comprising:
   an input device;
   an output device;
   a processor device operably connected to the input device and the output device; and
   a memory device operably connected to the processor device and comprising:
      a stack structure including:
         a first section comprising conductive structures vertically alternating with insulative structures; and
         a second section horizontally neighboring the first section, the second section comprising further insulative structures and the insulative structures vertically alternating with the further insulative structures;
      a source structure underlying the stack structure;
      digit line structures overlying the stack structure;
      strings of memory cells extending through the stack structure and coupled to the source structure and the digit line structures;
      conductive contact structures extending through the stack structure and the source structure, the conductive contact structures comprising:
         an upper region extending through the stack structure and the source structure; and
         a lower region underlying the source structure and having a horizontal cross sectional area greater than that of the upper region, wherein the contact structures comprise substantially monolithic structures including the upper region and the lower region;
      control logic circuitry underlying the source structure and coupled to the conductive contact structures; and conductive routing structures overlying the digit line structures and coupled to the conductive contact structures.

15. The electronic system of claim 14, wherein the memory device comprises a three-dimensional NAND Flash memory device.

* * * * *